(12) United States Patent
Ito et al.

(10) Patent No.: US 7,153,559 B2
(45) Date of Patent: Dec. 26, 2006

(54) CERAMIC-METAL COMPOSITE BODY, COMPOSITE STRUCTURE FOR TRANSPORTING OXIDE ION, AND COMPOSITE BODY HAVING SEALING PROPERTY

(75) Inventors: Wataru Ito, Chiba (JP); Tadashi Sakon, Chiba (JP); Hitoshi Dohnomae, Chiba (JP); Toru Nagai, Chiba (JP)

(73) Assignee: Nippon Steel Corporation, Tokyo (JP)

( * ) Notice: Subject to any disclaimer, the term of this patent is extended or adjusted under 35 U.S.C. 154(b) by 349 days.

(21) Appl. No.: 10/363,969

(22) PCT Filed: Sep. 7, 2001

(86) PCT No.: PCT/JP01/07778

§ 371 (c)(1),
(2), (4) Date: Mar. 7, 2003

(87) PCT Pub. No.: WO02/20143

PCT Pub. Date: Mar. 14, 2002

(65) Prior Publication Data

US 2003/0188637 A1    Oct. 9, 2003

(30) Foreign Application Priority Data

Sep. 8, 2000 (JP) .............................. 2000-273165
May 30, 2001 (JP) .............................. 2001-162931

(51) Int. Cl.
*B01D 61/36* (2006.01)
*B01D 63/06* (2006.01)
*B32B 1/04* (2006.01)
*B32B 1/06* (2006.01)
*B32B 7/04* (2006.01)
*B32B 10/08* (2006.01)

(52) U.S. Cl. ...................... 428/173; 428/119; 428/137; 428/138; 428/321.5; 428/702; 96/4; 96/10; 502/4

(58) Field of Classification Search ............... None
See application file for complete search history.

(56) References Cited

U.S. PATENT DOCUMENTS 5,376,167 A    12/1994    Broutin et al.

(Continued)

FOREIGN PATENT DOCUMENTS

EP    0 705 790    4/1996

(Continued)

OTHER PUBLICATIONS

Y. Teraoka et al., "Oxygen Permeability of $La_{1-x}Sr_xCo_{1-y}Fe_yO_3$ Perovskite- Type Oxides," Bulletin of the Chemical Society of Japan, 7th issue, 1988, pp. 1084-1089. (English Abstract attached to the Japanese article.).

(Continued)

*Primary Examiner*—Jennifer C. McNeil
*Assistant Examiner*—Jason L. Savage
(74) *Attorney, Agent, or Firm*—Baker Botts LLP

(57) ABSTRACT

A sealing technique is established in which a seal can be easily formed and which is excellent in reliability and a heat cycle property in a high temperature region of 800° C. or higher, so as to provide a composite body preferably used for a device for producing pure oxygen, oxygen-rich air, and the like, a membrane reactor represented by that for partial oxidation of a hydrocarbon gas, a solid oxide fuel cell, an oxygen purification device, a heat exchanger, or the like. The present invention makes it possible to increase a possibility of practical use in a wide area which has been delayed in development owing to a bottleneck of improvement in a sealing property. Particularly, its application to the device for producing pure oxygen, oxygen-rich air, or the like, the membrane reactor represented by that for partial oxidation of the hydrocarbon gas, the solid oxide fuel cell, the oxygen purification device, the heat exchanger, or the like can greatly contribute to acceleration of the development.

7 Claims, 18 Drawing Sheets

U.S. PATENT DOCUMENTS

| | | | |
|---|---|---|---|
| 5,569,633 A * | 10/1996 | Carolan et al. | 502/4 |
| 5,683,797 A * | 11/1997 | Carolan et al. | 428/307.3 |
| 5,723,035 A * | 3/1998 | Mazanec et al. | 204/295 |
| 5,725,218 A | 3/1998 | Maiya et al. | |
| 5,744,015 A * | 4/1998 | Mazanec et al. | 204/295 |
| 6,187,157 B1 * | 2/2001 | Chen et al. | 204/296 |
| 6,378,230 B1 * | 4/2002 | Rotem et al. | 36/50.1 |
| 6,410,161 B1 * | 6/2002 | Li | 428/621 |
| 6,488,739 B1 * | 12/2002 | Mazanec et al. | 95/54 |
| 6,623,881 B1 * | 9/2003 | Badding et al. | 429/30 |
| 6,875,528 B1 * | 4/2005 | Nagai et al. | 428/701 |

FOREIGN PATENT DOCUMENTS

| | | |
|---|---|---|
| EP | 0 723 281 | 7/1996 |
| JP | 40-016924 | 8/1965 |
| JP | 50-44473 | 8/1973 |
| JP | 50-84440 | 11/1973 |
| JP | 58-156581 | 9/1983 |
| JP | 63-156516 | 6/1988 |
| JP | 01-028284 | 1/1989 |
| JP | 03-062460 | 3/1991 |
| JP | 05029010 | 2/1993 |
| JP | 05029011 | 2/1993 |
| JP | 05325999 | 12/1993 |
| JP | 06231784 | 8/1994 |
| JP | 06285620 | 10/1994 |
| JP | 07057748 | 3/1995 |
| JP | 07070604 | 3/1995 |
| JP | 07-105762 | 4/1995 |
| JP | 07-237980 | 9/1995 |
| JP | 07265673 | 10/1995 |
| JP | 07-335230 | 12/1995 |
| JP | 08007904 | 1/1996 |
| JP | 08132226 | 5/1996 |
| JP | 08-173776 | 7/1996 |
| JP | 09115530 | 5/1997 |
| JP | 09129251 | 5/1997 |
| JP | 09-270479 | 10/1997 |
| JP | 10012252 | 1/1998 |
| JP | 10116624 | 5/1998 |
| JP | 11154525 | 6/1999 |
| JP | 2000-182642 | 6/2000 |
| JP | 2001-079657 | 3/2001 |
| JP | 2002-530842 | 9/2002 |

OTHER PUBLICATIONS

International Preliminary Examination Report issued Nov. 12, 2002.

Summary of Office Action from Japan Patent Office, Aug. 30, 2005 re Appln. No. 2000-273165.

* cited by examiner

CERAMIC-METAL COMPOSITE BODY, COMPOSITE STRUCTURE FOR TRANSPORTING OXIDE ION, AND COMPOSITE BODY HAVING SEALING PROPERTY

CROSS-REFERENCE TO RELATED APPLICATIONS

This application is a national stage application of PCT Application No. PCT/JP01/07778 which was filed on Sep. 7, 2001 and published Mar. 14, 2002 as International Publication No. WO 02/20143 (the "International Application"). This application claims priority from the International Application pursuant to 35 U.S.C. § 365. The present application also claims priority under 35 U.S.C. § 119 from Japanese Application Nos. 2000-273165 and 2001-162931, filed Sep. 8, 2000 and May 30, 2001, respectively.

TECHNICAL FIELD OF THE INVENTION

The present invention relates to a ceramic-metal composite body, a composite structure for transporting oxide ions, and a composite body having a sealing property, and is particularly directed to a membrane reactor, an oxygen separation device, and an applied device for oxide ion transportation using the same.

BACKGROUND INFORMATION

A sealing technique in a high temperature region over 800° C. will be explained below by taking examples.

First, pure oxygen production and oxygen-rich air production will be described. In this technique, low-cost oxygen or oxygen-rich air is supplied, which brings about an enormous economic effect in industries such as steel, glass, and cement where a large amount of oxygen is consumed. The principle of producing pure oxygen or oxygen-rich air using a mixed-conducting oxide which has oxide ion conductivity and electronic conductivity at the same time is based on the phenomenon that, when two kinds of gases having different oxygen partial pressures are segregated by the mixed-conducting oxide, oxygen in a form of oxide ions permeates the oxide from the high oxygen partial pressure side to the low oxygen partial pressure side.

For example, an oxygen-containing mixed gas (such as air) is compressed to have higher oxygen partial pressure than a gas to be collected (pure oxygen or oxygen-rich air) so that an oxygen gas is separated from the oxygen-containing mixed gas. Efficiency in separating the oxygen gas depends on thickness of the mixed-conducting oxide, difference in oxygen partial pressure on the both sides, and oxide ion conductivity, among which the finally listed conductivity greatly changes depending on temperature, and therefore a temperature region of 800° C. or higher is selected practically. If a gas sealing property is poor in this temperature region, such problems arise that purity of obtained oxygen lowers or production efficiency of oxygen-rich air lowers.

As a second example, a membrane reactor represented by that for partial oxidation of a hydrocarbon gas in which the mixed-conducting oxide is also used will be described. The technology of making a natural gas into liquid fuel (gas to liquid=GTL) has become focused from the viewpoint of the effective use of natural resources, and a technique to be described here is important for the technology as an elemental technique thereof. The principle of the membrane reactor is that an oxygen-containing gas (air, for example) and a hydrocarbon gas (a natural gas mainly composed of methane, for example) are segregated by the mixed-conducting oxide so that oxygen permeates the oxide from the air side to the hydrocarbon gas side, and the hydrocarbon gas is oxidized on a surface of the oxide on the hydrocarbon gas side thereby obtaining a synthesized gas (a mixed gas of carbon monoxide and hydrogen) or a partially oxidized body. Similarly to the oxygen production described above, 800° C. or higher temperature is selected as operation temperature. A poor gas sealing property in this temperature region not only becomes a big factor of reduction in reaction efficiency but also causes complete combustion of hydrocarbon without stopping in extreme cases, which produces a risk of explosion.

As a third example, a solid oxide fuel cell using an oxide ion conducting oxide will be described whose power generation efficiency is high and which is focused as a clean power generation method of an environmentally friendly type. This technology has an advantage that, since a fuel cell is operated at high temperature, total energy efficiency of 70 to 80% can be finally expected if waste heat is used for cogeneration, and research and development are currently conducted intensively. The operation principle of the solid oxide fuel cell is that a fuel gas such as hydrogen and air are segregated by the oxide ion conducting oxide and oxide ions move through the oxide so that electric power is obtained. Yttria stabilized zirconia (YSZ) which is currently being developed is known for having high ion conductivity among oxide ion conducting oxides, but its conductivity is lower than that of the aforesaid mixed-conducting oxide. Therefore, an operation temperature region of a solid oxide fuel cell using YSZ is 900° C. or higher. Also in this technology, a poor gas sealing property may possibly become the prime cause of reduction in output or cause the worst cases such as explosion.

As stated above, a sealing technique in the high temperature region over 800° C. has very important meanings and various sealing methods have been thought, many of which can be seen in a fuel cell region where the development is most advanced. In a case of a fuel cell having a flat-plate structure, a part between a battery cell and a separator (or an interconnector) needs to be sealed. As a sealing material, a ceramic adhesive, various glasses such as borosilicate glass or sodium silicate glass, a heat-resistant metal gasket, a sintered body obtained by firing oxide fine powders, and the like are known.

Japanese Patent Application Laid-open No. Hei 5-325999 describes a sealing material composed of an oxide of a binary or higher system whose solid phase forms a matrix and whose liquid phase functions as a sealing material in a solid-liquid coexisting range of not lower than solidus temperature and not higher than liquidus temperature by controlling a composition ratio of sodium silicate glass.

Japanese Patent Application Laid-open No. Hei 6-231784 describes a sealing material in which a metal foil reinforced by ceramic fiber is used as an aggregate and sodium silicate glass is held by the aggregate.

Japanese Patent Application Laid-open No. Hei 8-7904 describes that a separator is previously heat-treated in the oxygen atmosphere to form an oxide layer on a surface thereof so that compatibility between the separator and a grass sealing material is increased, thereby improving a sealing property.

Japanese Patent Application Laid-open No. Hei 9-115530 describes a method in which a concave part and a protruding part are provided in an upper and a lower surface of a separator respectively so as to make a tenon-joint structure in which these parts are fit, and a heat-resistant metal gasket is inserted between the separator and a solid electrolyte to have their surfaces come in contact with each other so that air tightness is secured.

Japanese Patent Application Laid-open No. Hei 10-116624, Japanese Patent Application Laid-open No. Hei 10-12252, and Japanese Patent Application Laid-open No. Hei 11-154525 describe a solid electrolyte fuel cell using, as a sealing material, a sintered body of raw material powders which are mainly composed of an ultra-fine particle oxide having higher melting point than operation temperature of the solid electrolyte fuel cell.

Japanese Patent Application Laid-open No. Hei 9-129251 describes a sealing method in which a material containing ingredients of both of two materials to be bonded is used as a sealing material in a solid electrolyte fuel cell.

While the techniques described above are directed to the flat-plate type fuel cell, a part between a cylindrical cell and a partition plate for holding it needs to be sealed in a case of a fuel cell having a cylindrical structure.

Japanese Patent Application Laid-open No. Hei 5-29010 and Japanese Patent Application Laid-open No. Hei 5-29011 describe a solid electrolyte fuel cell in which glass is used for sealing between a cylindrical cell and a flange and between the flange and a gas sealing plate (partition plate).

Further, as for a sealing technique in other regions than the fuel cell, P. S. Maiya and et al. (U.S. Pat. No. 5,725,218), the entire disclosure of which is incorporated herein by reference, describes disclose a sealing technique for a part between an Inconel and a solid electrolyte (SFC-2) in a membrane reactor which partially oxidizes methane. Mixed powders of $SrO$, $B_2O_3$, and $SrFeCu_{0.5}O_x$ oxides are selected as a sealing material and they are heated and melted so that a sealing property is obtained.

As described above, a gas sealing technique in a temperature region over 800° C. brings about an enormous economic effect as well as it is an elemental technique indispensable for development of the leading-edge technology which solves environmental problems.

However, the conventional arts are still susceptible to improvement in term of reliability and a heat cycle property although substantial efforts have been made to form a seal, and establishment of a sealing technique in which the seal can be easily formed and which is excellent in reliability and the heat cycle property is desperately desired.

One of the causes of the difficulty in the sealing techniques is thermal expansivity inherent in a material. Specifically, since a temperature region to be used is very high, difference in thermal expansivity between bonding materials becomes more prominent as the temperature increases even though the difference is not so large.

In the present case, linear thermal expansion coefficients of representative materials will be listed below.

Perovskite oxide ion mixed-conducting oxides generally have very high linear thermal expansion coefficients. For example, average linear thermal expansion coefficients from room temperature to 800° C. of La—Sr—Co—Fe mixed-conducting oxides, which are known for high oxide ion conductivity, are approximately $26 \times 10^{-6}/°$ C. in a case of $(La_{0.2}Sr_{0.8})(Co_{0.8}Fe_{0.2})O_x$ and approximately $20 \times 10{-6}/°$ C. in a case of $(La_{0.2}Sr_{0.8})(Co_{0.4}Fe_{0.4}CU_{0.2})O_x$. In comparison, linear thermal expansion coefficients of metal are as small as $17.5 \times 10^{-6}/°$ C. (average of 0 to 650° C.) in a case of stainless steel SUS310S and approximately $14.2 \times 10/°$ C. (average of 0 to 100° C.) in a case of Incoloy (Incoloy800), and further smaller is that of YSZ, which is approximately $10 \times 10/°$ C. (average of 0 to 1000° C.). Glass shows extremely small linear thermal expansion of around $1 \times 10^{-6}/°$ C. (average of 20 to 1000° C.).

The conventional arts in which glass is used as a sealing material utilize the fact that a glass part melts at usage temperature over 800° C. so that a liquid seal having high air tightness can be realized.

However, if the melted glass is used as the sealing material, such problems arise that the sealing material elutes from a bonded portion during usage or the melted glass cannot resist pressure difference when segregated two kinds of gases do not have the same pressure as in the pure oxygen production described above. Further, the glass material also has such problems that high adhesive strength cannot be obtained, a stable property cannot be obtained because alteration of the sealing material such as vaporization or crystallization of ingredients occurs during long-term usage at high temperature, the sealing property cannot be maintained after several heat cycles because of thermal expansion difference if the glass solidifies at low temperature, and chemical reaction with a material to be bonded (particularly, an oxide solid electrolyte) occurs to degrade the material to be bonded.

Japanese Patent Application laid-open No. Hei 10-116624 gazette, Japanese Patent Application laid-open No. Hei 10-12252 gazette, Japanese Patent Application laid-open No. Hei 11-154525 gazette, Japanese Patent Application laid-open No. Hei 9-129251 gazette, and U.S. Pat. No. 5,725,218 described above aim at solving the problem caused by difference in thermal expansivity and giving a stable gas sealing property and a heat-resistant cycle property even in long-term usage at high temperature because thermal expansivity of a sealing material is close to thermal expansivity of two kinds of materials to be bonded.

However, there are some cases where firing temperature of the sealing material is close to firing temperature of the two materials to be bonded, or higher than firing temperature of one of the materials to be bonded depending on combination, which leads to a problem that the material to be bonded is damaged by heat in the step of firing the sealing material. Further, since there are also such problems that the method is troublesome in that the sealing material is formulated and sintered as required, and a sealing property is still susceptible to improvement, the techniques have not been practically used yet.

The present invention is made considering the problems described above, and it is an object of the present invention to provide a composite body in which a seal can be easily formed and a sealing property excellent in reliability and heat cycle property is realized in a high temperature region of 800° C. or higher, a manufacturing method thereof, and a device using the composite body.

Further, the present invention intends to realize a highly efficient applied device for oxygen ion transportation by an idea associated with a usage pattern of oxygen ion transporting ceramic. Specifically, it is an object of the present invention to assemble the highly efficient applied device for oxygen ion transportation by providing an optimal composite structure for transporting oxygen ions to integrate and fix a tubular body, in which a porous ceramic base is covered with an oxygen ion transporting ceramic dense film, to a reaction container.

It is another object of the present invention to provide a ceramic-metal composite structure in which a gas sealing property at high temperature is given to a bonded part between a bonded body obtained by bonding at least one kind of ceramic selected from oxide ion conducting ceramic, electronic conducting ceramic, and mixed-conducting ceramic, or a plurality of the ceramic, and a metal member, and which is excellent in durability against repetition of high temperature and room temperature and maintainability, and a preferred method of producing the same.

It is still another object of the present invention to provide a gasket which gives a gas sealing property at high temperature to the bonded part between the ceramic and the metal member and which is excellent in durability against repetition of high temperature and room temperature and maintainability.

It is yet another object of the present invention to provide a low-cost applied device for oxygen transportation of high reliability and high efficiency in which the ceramic-metal composite structure is included in a case and a gas sealing property at high temperature is given to the bonded part between the ceramic and the metal member, and which has excellent durability against repetition of high temperature and room temperature and improves maintainability.

SUMMARY OF THE INVENTION

A composite body having a sealing property of the present invention is a composite body including a structure which has a reservoir formed by combining plural members and a metal member, and has a sealing property characterized in that it is obtained by filling the metal member into the reservoir and filling the metal member into a part or the whole of a combined boundary part between the members constituting the structure. In one form of the composite body having the sealing property of the present invention, softening temperature of the metal member is lower than softening temperature of the members constituting the structure.

In one form of the composite body having the sealing property of the present invention, the metal member is silver or a silver alloy.

In one form of the composite body having the sealing property of the present invention, each of the members constituting the structure is made of ceramic or metal, and the structure is constituted as combination of ceramic and ceramic, metal and metal, or ceramic and metal.

In one form of the composite body having the sealing property of the present invention, average linear thermal expansion coefficients from room temperature to 850° C. of the members constituting the structure are not lower than $16 \times 10^{-6}/°$ C. and not higher than $26 \times 10^{-6}/°$ C.

A composite body of the present invention is a composite body including a structure which has a reservoir formed by combining plural members and silver or a silver alloy which has lower softening temperature than softening temperature of the members constituting the structure, and it is characterized in that the members constituting the structure are made of ceramic and metal, the structure is constituted as combination of ceramic and metal, average linear thermal expansion coefficients from room temperature to 850° C. of the members are not lower than $16 \times 10^{-6}/°$ C. and not higher than $26 \times 10^{-6}/°$ C., at least a part of the members is made of an oxide material having oxide ion permeability, the silver or silver alloy is filled in the reservoir, and a part or the whole of a combined boundary part between the members constituting the structure is filled with the silver or silver alloy.

In one form of the composite body having the sealing property of the present invention, the oxide material having oxide ion permeability is a mixed-conducting oxide which has a cubic perovskite crystal structure and whose composition formula is represented by;

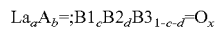

$$La_a A_b=;B1_c B2_d B3_{1-c-d}=O_x$$

In this case, A is one kind or combination of two or more kinds of elements selected from Sr, Ba, and Ca, B1 is Co or combination of Co and Fe elements, a Co/Fe ratio is 1 or higher, B2 is one kind or combination of two or more kinds of elements selected from Nb, Ta, In, and Sn, B3 is one kind or combination of two or more kinds of elements selected from Li, Ni, Cu, Zn, and Mg. Note that $0 \leq a\ 0.5$, $0.5\ b \leq 1$, $0.6 \leq c\ 1$, $0\ d \leq 0.4$, $0.9 \leq a+b \leq 1.1$, and x is such a number that an electric charge of the compound becomes neutral).

A composite body having a sealing property of the present invention is a composite body of a structure obtained by at least combining a hollow member which has an oxide ion permeable oxide layer and is sealed at one end and a flange member and silver or a silver alloy, and it is characterized in that the structure is combination of metal and ceramic, has a reservoir formed by combining an open end of the hollow member and the flange member, and is obtained by filling the silver or silver alloy in the reservoir.

A composite body having a sealing property of the present invention is a composite body obtained by combining a member which has a circular concave part and a member which has a convex part capable of being inserted into the concave part, and it is characterized in that the members are made of combination of ceramic and metal, a reservoir formed by inserting the convex part into the concave part is filled with silver or a silver alloy, and a part or the whole of a combined boundary part between the convex part and the concave part is filled with the silver or silver alloy.

A method of manufacturing a composite body having a sealing property of the present invention includes the steps of: forming a structure having a reservoir by combining plural members which are made of combination of ceramic and metal; inserting at least one kind of metal material selected from metal members or metallized members which soften at lower temperature than that of the members constituting the structure into the reservoir, and heating at least the reservoir at temperature in a range of not lower than softening temperature of the metal material inserted into the reservoir and lower than softening temperature of the members constituting the structure so that the metal material is filled into the reservoir and at least a part of a combined boundary part between the members constituting the structure while being cured.

In one form of the method of manufacturing the composite body having the sealing property of the present invention, the metal material inserted into the reservoir is at least one kind selected from silver, an silver alloy, clay including silver, clay including a silver alloy, slurry including silver, and slurry including a silver alloy.

An oxygen separation device of the present invention includes the composite body having the sealing property.

A membrane reactor of the present invention includes the composite body having the sealing property.

A ceramic-metal composite structure of the present invention is a ceramic-metal composite structure including at least one kind of ceramic, which is selected from oxide ion conducting ceramic, electronic conducting ceramic, and mixed-conducting ceramic having both of oxide ion conductivity and electronic conductivity, and a metal member, and it is characterized in that a bonding member for the ceramic and the metal member is made of silver or a silver alloy.

A ceramic-metal composite structure of the present invention is a ceramic-metal composite structure including a bonded body in which plural ceramic selected from oxide ion conducting ceramic, electronic conducting ceramic, and mixed-conducting ceramic having both of oxide ion conductivity and electronic conductivity are bonded, and a metal member, and it is characterized in that a bonding member for the ceramic and the metal member is made of silver or a silver alloy.

In one form of the ceramic-metal composite structure of the present invention, the bonded body is obtained by bonding an oxide ion conducting ceramic dense body or a mixed-conducting ceramic dense body and a mixed-conducting ceramic porous body or an electronic conducting ceramic porous body.

A method of manufacturing a ceramic-metal composite structure of the present invention is a method of manufacturing a ceramic-metal composite structure including at least one kind of ceramic which is selected from oxide ion conducting ceramic, electronic conducting ceramic, and mixed-conducting ceramic having both of oxide ion conductivity and electronic conductivity, and a metal member, and it is characterized in that a noble metal clay gasket made of silver or a silver alloy, or a noble metal gasket made of silver or a silver alloy is sandwiched between bonded surfaces of the ceramic and the metal member, and heat-treated at temperature not lower than 550° C. and not higher than 950° C. to bond the ceramic and the metal member.

A method of manufacturing a ceramic-metal composite structure of the present invention is a method of manufacturing a ceramic-metal composite structure including a bonded body, in which plural ceramic selected from oxide ion conducting ceramic, electronic conducting ceramic, and mixed-conducting ceramic having both of oxide ion conductivity and electronic conductivity are bonded, and a metal member, and it is characterized in that a noble metal clay gasket made of silver or a silver alloy, or a noble metal gasket made of silver or a silver alloy is sandwiched between bonded surfaces of the ceramic and the metal member, and heat-treated at temperature not lower than 550° C. and not higher than 950° C. to bond the ceramic and the metal member.

A gasket of the present invention is a gasket used for a ceramic-metal composite structure including at least one kind of ceramic, which is selected from oxide ion conducting ceramic, electronic conducting ceramic, and mixed-conducting ceramic having both of oxide ion conductivity and electronic conductivity, and a metal member so as to connect the ceramic and the metal member, and it is characterized in that the gasket is obtained by cutting out a noble metal clay sheet made of silver or a silver alloy, or a noble metal sheet made of silver or a silver alloy into a ring shape.

A gasket of the present invention is a gasket used for a ceramic-metal composite structure which includes a bonded body, in which plural ceramic selected from oxide ion conducting ceramic, electronic conducting ceramic, and mixed-conducting ceramic having both of oxide ion conductivity and electronic conductivity are bonded, and a metal member so as to connect the ceramic and the metal member, and it is characterized in that the gasket is obtained by cutting out a noble metal clay sheet made of silver or a silver alloy, or a noble metal sheet made of silver or a silver alloy into a ring shape.

An applied device for oxygen transportation of the present invention is an applied device for oxygen transportation including a structure in which the inside of a case is parted by a composite structure including at least one kind of ceramic which is selected from oxide ion conducting ceramic, electronic conducting ceramic, and mixed-conducting ceramic having both of oxide ion conductivity and electronic conductivity, and a metal member, and it is characterized in that a bonding member for the ceramic and the metal member is made of silver or a silver alloy.

An applied device for oxygen transportation of the present invention is an applied device for oxygen transportation including a structure in which the inside of a case is parted by a composite structure including a bonded body in which plural ceramic selected from oxide ion conducting ceramic, electronic conducting ceramic, and mixed-conducting ceramic having both of oxide ion conductivity and electronic conductivity are bonded, and a metal member, and it is characterized in that a bonding member for the ceramic and the metal member is made of silver or a silver alloy.

In one form of the applied device for oxygen transportation of the present invention, the metal member is a part of the case.

A composite structure for transporting oxide ions of the present invention is a composite structure including a tubular main part sealed at one end and a flange bonded to the opening side of the main part, and it is characterized in that the main part is obtained by covering a porous ceramic base with an oxide ion transporting ceramic dense film, the flange is a tubular body made of dense electronic conducting ceramic, oxide ion transporting ceramic, or electrical insulating ceramic, and the outer dimension of a part or the whole of the flange in its radial direction is larger than the outer dimension of the tubular main part in a long diameter direction.

In one form of the composite structure for transporting oxide ions of the present invention, the outer dimension of the flange in the radial direction is larger than the outer dimension of the tubular main part in the long diameter direction by length in a range from 2 mm to 200 mm.

In one form of the composite structure for transporting oxide ions of the present invention, the composite structure is made of such materials that deformation starting temperature or decomposition starting temperature of the porous ceramic base is higher than densification temperature of the oxide ion transporting ceramic dense film.

In one form of the composite structure for transporting oxide ions of the present invention, the oxide ion transporting ceramic dense film, the porous ceramic base, and the flange made of oxide ion transporting ceramic are mixed-conducting oxides.

In one form of the composite structure for transporting oxide ions of the present invention, the oxide ion transporting ceramic dense film is a mixed-conducting oxide having a cubic perovskite crystal structure and whose composition formula is represented by;

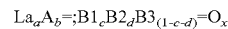

$$La_aA_b=;B1_cB2_dB3_{(1-c-d)}=O_x$$

(in which A is one kind or combination of two or more kinds of elements selected from Sr, Ba, and Ca, B1 is Co or combination of Co and Fe elements, a Co/Fe ratio is 1 or higher, B2 is one kind or combination of two or more kinds of elements selected from Nb, Ta, In, and Sn, and B3 is one kind or combination of two or more kinds of elements selected from Li, Ni, Cu, Zn, and Mg. Note that $0 \leq a\ 0.5$, $0.5 b \leq 1$, $0.6 \leq c\ 1$, $0\ d \leq 0.4$, $0.9 \leq a+b \leq 1.1$, and x is such a number that an electric charge of the compound becomes neutral).

In one form of the composite structure for transporting oxide ions of the present invention, the flange is bonded with a metal member.

An applied device for oxide ion transportation of the present invention is characterized in that it uses a plurality of the composite structures for transporting oxide ions.

DETAILED DESCRIPTION OF THE PREFERRED EMBODIMENTS

Hereinafter, specific embodiments to which the present invention is applied will be explained in detail with reference to the drawings.

First Embodiment

Structure of Composite Body

First, a "reservoir" formed by combining plural members of the present invention indicates a portion from which a fluid material does not flow out when the fluid material is put in a state where only a gravitational field acts, and a state where other forces than gravity (such as centrifugal force, for example) act is not included.

Next, preferred specific examples of the present invention are shown in FIG. 1A to FIG. 1F. Each of FIG. 1A to FIG. 1F is a schematic cross sectional view of a composite body of a structure having a reservoir, which is formed by combining plural members, and a metal member. In any of them, the metal member is filled in the reservoir of the structure and a part or the whole of a combined boundary part between the members forming the structure is filled with the metal member.

Figure 1A:
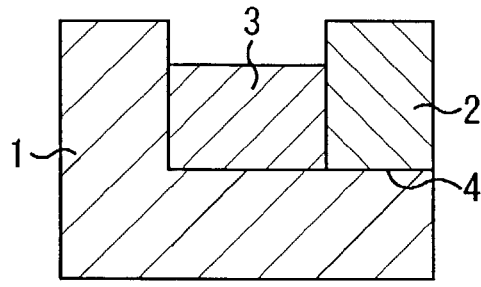
FIG. 1A to FIG. 1F show preferred specific examples of the present invention, and each of the drawings is a schematic cross sectional view of a composite body of a structure, which has a reservoir formed by combining plural members, and a metal member.
Figure 1D:
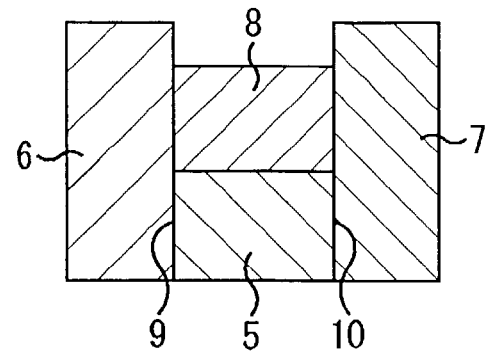
Figure 1B:
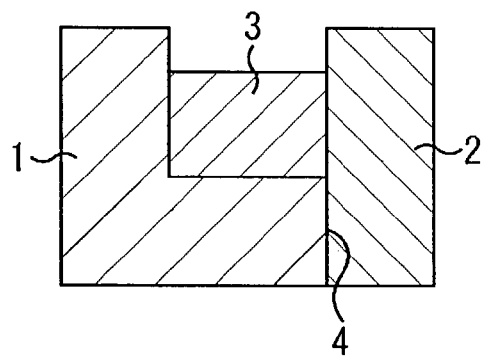
Figure 1E:
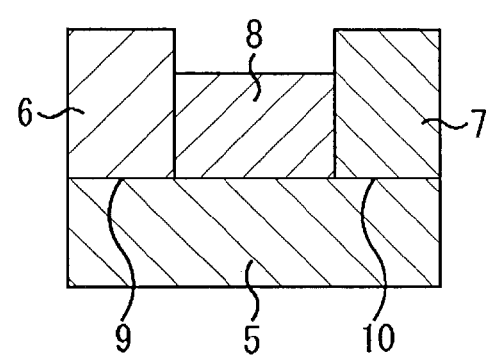
Figure 1C:
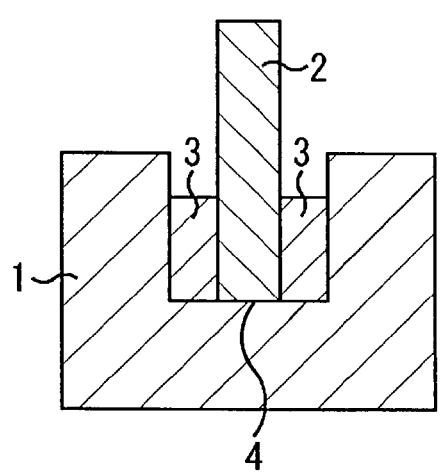
Figure 1F:
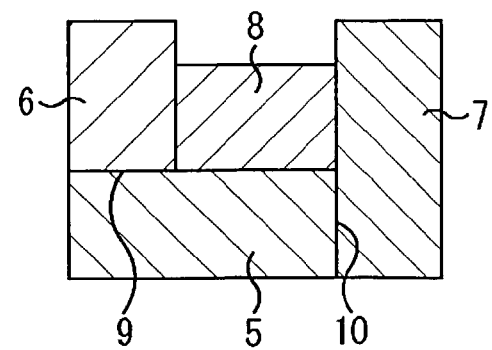

Each of FIG. 1A, FIG. 1B, and FIG. 1C shows a composite body of a structure constituted of two members 1, 2 and a metal member 3, in which a boundary part 4 between the member 1 and the member 2 is sealed with the metal member 3. Each of FIG. 1D, FIG. 1E, and FIG. 1F shows a composite body of a structure constituted of three members 5, 6, 7 and a metal member 8, in which a boundary part 9 between the member 5 and the member 6, and/or a boundary part 10 between the member 5 and the member 7 is sealed with the metal member 8.

Each of the members forming the structures (1, 2, 5 to 7, for example) is made of ceramic or metal, and the structure is constituted as combination of ceramic only, metal only, or ceramic and metal. Since it is an object of the present invention to provide a composite body which is characterized in the sealing structure capable of maintaining a sealing property even at high temperature over 800° C., a poor heat-resistant material such as, for example, a polymeric material besides ceramic and metal is not preferable as the member forming the structure. For the metal member, a material is selected which has low softening temperature as compared with all of the members forming the structure. In other words, the metal member 3 is a member softening at lower temperature than that of either of the members 1, 2, and the metal member 8 is a member softening at lower temperature than that of any of the members 5 to 7.

As stated above, the metal member used in the present invention can be made of any material having low softening temperature as compared with those of all of the members of the structure which has the reservoir formed by combining the plural members, and particularly, when all the members forming the structure are made of stable materials which do not soften at 1000° C., silver or a silver alloy is preferably used for the following two reasons. The first reason is that the melting point of silver is 961° C. and the melting point of the silver alloy is also around the temperature, which means that the relationship in softening temperature is in a range of the present invention. The second reason for using silver or the silver alloy lies in a chemical property of silver. Silver has such a property as to be stable as an oxide from room temperature to approximately 200° C. while to release oxygen and become stable as metal at the temperature higher than approximately 200° C. In other words, since silver maintains a metal state at high temperature even if it is heat-treated in the air, a sealing property at the combined boundary part between the plural members is not impaired due to a grown oxide at an interface with the member forming the structure, thereby realizing a reliable seal. Further, the bonded members do not suffer chemical reaction to degrade their properties because silver is chemically stable.

Any composition of the silver alloy is possible but 35 mass % or more silver as a compounded ingredient is preferable in order not to impair the aforesaid property of silver. As other ingredients than silver, for example, Cu, Au, Zn, Pb, Cd, Ni, Sn, Mn, Li, In, Pd, Ti, Cr, Co, Fe, Ga, and so on can be compounded.

When the composite body of the present invention is used for a device for producing pure oxygen, oxygen-rich air or the like, a membrane reactor represented by that for partial oxidation of a hydrocarbon gas, a solid oxide fuel cell, or the like, an oxide ion permeable oxide material is included in the members constituting the structure. As the oxide ion permeable oxide material, preferably used is an oxide having oxide ion conductivity of $10^{-2}$ Scm$^{-1}$ or higher at 850° C., such as an oxide ion conducting article based on bismuth oxide, ceria, zirconia, or the like, or an oxide ion-electron mixed-conducting article such as zirconia including a perovskite oxide, pyrochlore oxide, or ceria, but an oxide having lower conductivity may be used depending on the purpose.

The members constituting the structure desirably have average linear thermal expansion coefficients from room temperature to 850° C. of not lower than $16 \times 10^{-6}$/° C. and not higher than $26 \times 10^{-6}$/° C. This is because, considering that the average thermal linear expansion coefficient from room temperature to 850° C. of a silver material is approximately $23 \times 10^{-6}$/° C. when the silver material is used as the metal member of the present invention, stress based on thermal expansion difference occurs and reliability of a seal lowers if the aforesaid range is not satisfied. Further, more desirably is that the plural members forming the structure have average linear thermal expansion coefficients close to each other as much as possible.

When the composite body of the present invention is used for the device for producing pure oxygen, oxygen-rich air or the like, the membrane reactor represented by that for partial oxidation of the hydrocarbon gas, the solid oxide fuel cell, or the like, it becomes important to increase an oxide ion permeation area as much as possible in order to increase a permeation amount of oxide ions so that manufacturing efficiency, reaction efficiency, or power generation efficiency is improved. Preferred specific examples for achieving this purpose are shown in FIG. 2A to FIG. 2E.

In the specific example in each of FIG. 2A to FIG. 2E, shown in a schematic cross sectional view of a composite body of a structure, in which a hollow member 11 having an oxide ion permeable oxide layer and sealed at one end and a flange member 12 having the larger outer diameter than the outer diameter of the hollow member 11 are combined, and silver or a silver alloy 13. In any of the examples, an open end of the hollow member and the flange member are combined to form a reservoir and the reservoir is filled with the silver or the silver alloy so that a boundary part 14 between the hollow member 11 and the flange member 12 is sealed. By arranging these composite bodies in a certain space with high integration, the permeation area can be dramatically increased.

In this case, since the flange member 12 has the larger outer diameter than the outer diameter of the hollow member 11, the composite bodies can be easily fixed to an integration plate using the flange members 12, which enables installation with high reliability and integration.

The reservoir formed by the plural members has a rectangular cross section in the composite body shown in each of FIG. 2A to FIG. 2E but, the reservoir may have a cross section of a triangle or other shapes as shown in FIG. 3A to FIG. 3F, not limited to the rectangular shape.

Figure 2A:
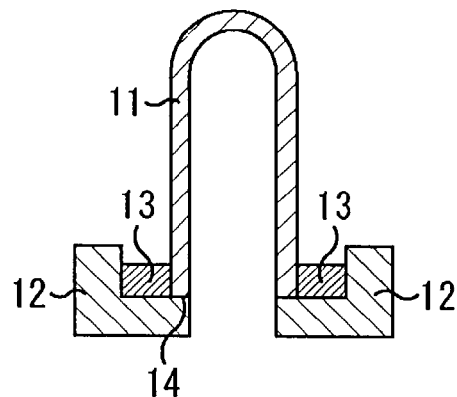
FIG. 2A to FIG. 2E show another preferred specific examples of the present invention, and each of the drawings is a schematic cross sectional view of a composite body effective at increasing an oxide ion permeation area.
Figure 2D:
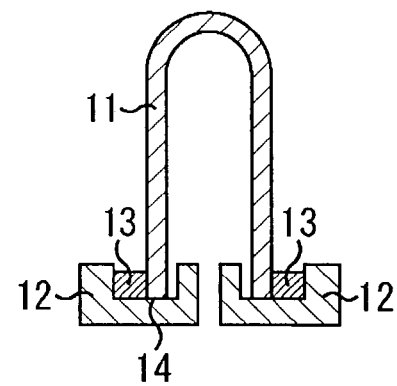
Figure 2B:
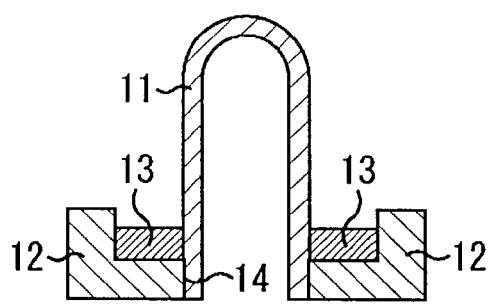
Figure 2E:
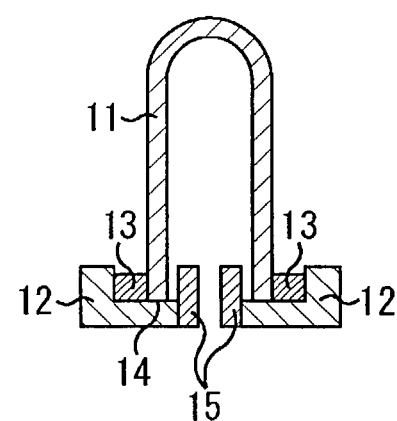
Figure 2C:
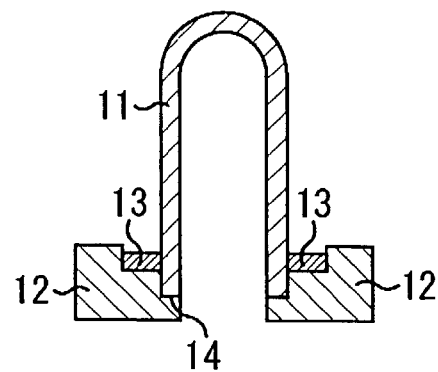
Figure 3A:
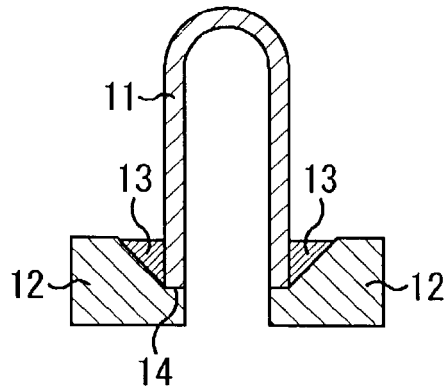
FIG. 3A to FIG. 3F show another preferred specific examples of the composite bodies shown in FIG. 2A to FIG. 2E, and each of the drawings is a schematic cross sectional view of a composite body effective at increasing the oxide ion permeation area.
Figure 3D:
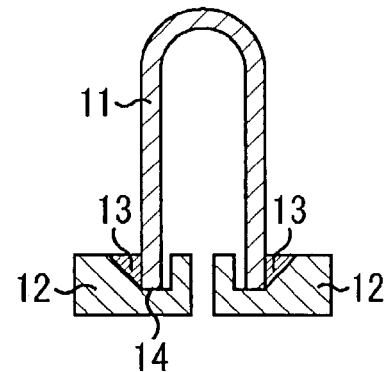
Figure 3B:
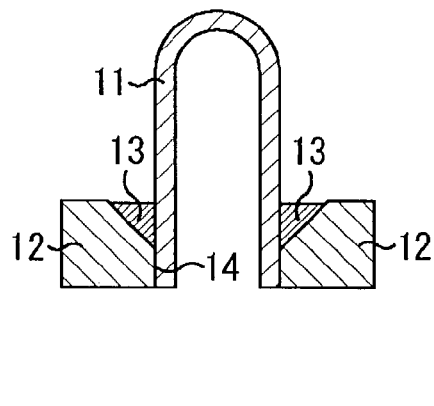
Figure 3E:
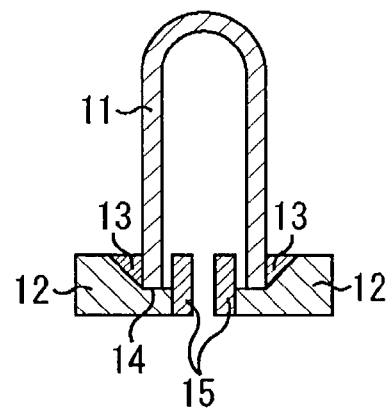
Figure 3C:
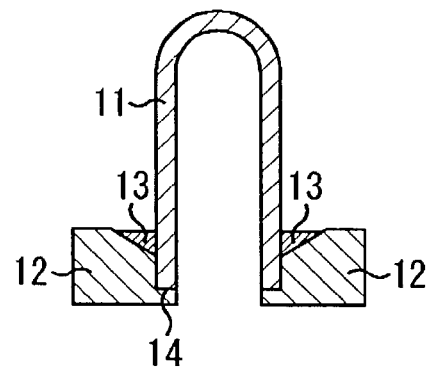

Among the examples shown in the drawings of FIG. 2A to FIG. 2E and FIG. 3A to FIG. 3F, FIG. 2D or FIG. 3D shows a form in which the flange member 12 is inserted also into a cylinder of the hollow member 11, which can fix the hollow member 11 more stably. Further, since this structure not only fixes the hollow member stably but also can prevent the metal material which has softened in the reservoir from flowing out even when a part of the boundary part 14 opens for some reasons, it is effective for realizing a composite body of higher reliability. As a similar structure, a core member 15 may be provided separately from the flange member 12 as shown in FIG. 2E or FIG. 3E.

Figure 3F:
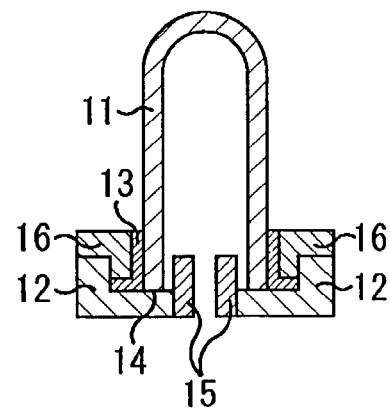

Further, as shown in FIG. 3F, still another member 16 may be combined with the flange member 12 so that the reservoir formed by the plural members has an L-shaped cross section.

The hollow member 11 has a cylindrical shape including the oxide ion permeable oxide layer and sealed at one end, and selectively passes oxide ions. Therefore, the hollow member 11 may be formed preferably of only the oxide ion permeable oxide layer. In this case, the entire hollow member should be densified enough to prevent other substances than oxide ions from permeating the oxide layer. Otherwise, even when a composite body having an excellent sealing property is provided, other impurities than oxide ions permeate the hollow member 11 to diffuse, which causes manufacturing efficiency, reaction efficiency, or power generation efficiency to lower.

As a method of manufacturing the dense hollow member, a general ceramic tube manufacturing method is used as it is. Specifically, after raw materials are weighed so as to obtain the prescribed composition and mixed, they are calcined, pulverized, and thereafter molded. For molding, a general method such as an isostatic pressing method (rubber pressing method), an extrusion molding method, or a slurry molding method can be applied.

Meanwhile, the hollow member may have the structure in which an oxide ion permeable ceramic dense film is formed over a cylindrical porous ceramic base sealed at one end. The oxide ion permeable oxide layer is thinned so that the raw materials and the manufacturing costs are reduced as well as oxide ion conductivity, which is hardly enough, can be augmented. For example, in the solid oxide fuel cell, resistance in the oxide layer drops a voltage when a current is taken. Since the value of the resistance in the oxide layer is obtained by multiplying a reciprocal of the oxide ion conductivity by the transportation distance of oxide ions, the resistance can be lowered by shortening the transportation distance of oxide ions, that is, thinning the oxide ion permeable oxide layer. Further, in producing oxygen or oxygen-rich air, the speed of oxide ions in the oxide is controlled by diffusion if the oxide ion permeable oxide layer is thick, and therefore permeation efficiency can be increased by thinning the oxide ion permeable oxide layer also in this case.

As stated above, the thinner oxide ion permeable oxide layer is more advantageous for increasing permeation efficiency while, as the oxide layer becomes thinner, it becomes more difficult to prevent other substances than oxide ions from permeating the oxide layer. The reason is that, if a defect such as a slight crack or a fine pinhole exists in this oxide layer, the other substances than oxide ions easily pass through the oxide layer because the oxide layer is thin. In such a case, the oxide ion permeable oxide layer may be formed to be thicker. Further, partial repair processing can be performed to the oxide layer as will be described in an example, and the hollow member 11 may have such a repaired layer.

Although thinning the oxide ion permeable oxide layer is effective at increasing permeation efficiency, the oxide layer cannot be indiscriminately thinned as described above. Another method for increasing permeation efficiency is to use an oxide having as high oxide ion conductivity as possible. If there is no intention of applying the composite body to the solid oxide fuel cell or an oxygen ion pump, a mixed-conducting oxide generally known for high oxide ion conductivity is preferably used. The application to the device is impossible because of such a fundamental problem that, when the mixed-conducting oxide is used, electrons move simultaneously with movement of oxide ions and electric charges are compensated in the oxide, which makes it impossible to take out electric power in the solid oxide fuel cell and to separate oxygen because a voltage cannot be applied in the oxygen ion pump, but the mixed-conducting oxide is very effective unless the application to the solid oxide fuel cell or the oxygen ion pump is not intended.

Among the mixed-conducting oxides, a mixed-conducting oxide having a cubic perovskite crystal structure represented by the following composition formula (1) has high oxide ion conductivity, and forming its thin film over the porous ceramic base is particularly effective. The reason for restricting the mixed-conducting oxides to those having the cubic perovskite crystal structure represented by the composition formula (1) will be described below.

;$La_aA_b=;B1_cB2_dB3_{(1-c-d)}=O_x$    (1)

A perovskite crystal structure is represented by a general formula of $ABO_{3-\delta}$ and many crystal systems thereof such as a trigonal system, an orthorhombic system, and a hexagonal system are known beside the cubic system. The difference comes from distortion of a crystal structure, regular/irregular arrangement of oxygen losses, difference in laminating $AO_3$ atomic layers, and the like. Further, it is also known that, when the oxygen losses increase and 3-δ in the composition formula decreases from 3 to 2.5, the perovskite crystal structure transforms to a brownmillerite structure, which is a different crystal structure. It has been found that a cubic oxide has high oxide ion conductivity among these many perovskite crystals having the $ABO_{3-\delta}$ composition.

The inventors of the present invention have focused on the cubic perovskite crystal structure, studied a composition range where the crystal structure is stable and oxide ion conductivity is high, and achieved a composition range disclosed in the present invention.

Specifically, a portion corresponding to A in the general formula of the composition formula $ABO_{3-\delta}$ is $[La_aA_b]$, in which A is one kind or combination of two or more kinds of elements selected from Sr, Ba, and Ca, $0 \leq a$ 0.5, $0.5 B \leq 1$, and $0.9 \leq a+b \leq 1.1$. The reason for thus restricting the ranges of a and b is that oxide ion conductivity lowers when La is excessively increased although the cubic system becomes more stable as La is increased more. Further, although (a+b) prescribes the nonstoichiometric composition of the $ABO_{3-\delta}$ composition except a+b=1, degradation in properties (oxide ion conductivity and crystal stability) based on the nonstoichiometric composition is not caused within the range described here while the structure is decomposed into plural oxides when the range is satisfied, leading to degradation in the properties.

On the other hand, a portion corresponding to B in the general formula of the composition formula $ABO_{3-\delta}$ is $[B1_cB2_dB3_{(1-c-d)}]$, in which B1 is Co or combination of Co and Fe elements, a Co/Fe ratio is 1 or higher, B2 is one kind or combination of two or more kinds of elements selected from Nb, Ta, In, Sn, V, Ti, Cr, and Mn, B3 is one kind or combination of two or more kinds of elements selected from Li, Ni, Cu, Zn, and Mg, $0.6 \leq c$ 1, and $0$ $d \leq 0.4$. The portion corresponding to B is thus restricted for the following reason. That is, as a result of selecting $Sr(Co, Fe)O_x$ as the basic composition of the cubic perovskite structure which has high oxide ion conductivity and studying substitution of the B portion, it has been found that there are two substituting element systems showing different effects.

First, a B2 system is a substituting element system stabilizing the cubic structure while having an effect of reducing oxygen losses because it has a valence of 3 or larger. Although an element of the B2 system is indispensable in stabilizing the cubic structure, oxide ion conductivity extremely lowers or the perovskite structure is not obtained if B2 exceeds 0.4. Accordingly, d is defined in the range of $0$ $d \leq 0.4$. On the other hand, a B3 system increases oxygen losses because of its small valence, which results in an effect of increasing oxide ion conductivity, but, if an excessively large amount thereof is substituted, the structure transforms from the perovskite stable structure to a different crystal structure such as the brownmillerite structure and oxide ion conductivity lowers. Accordingly, also in the B3 system, a substitution amount should be less than 0.4. Further, B1 is defined as Co or combination of Co and Fe elements and the Co/Fe ratio is defined as 1 or higher also because oxide ion conductivity lowers when Fe exceeds Co.

It should be noted that the chemical composition restricted in the present invention is the ideal one, and there is no problem even if a different type of metal at an impurity level is mixed in the oxide having the aforesaid composition formula (1) as long as the cubic perovskite crystal structure is stable and oxide ion conductivity is not greatly impaired.

As described above, even though the oxide layer is not thinned indiscriminately, permeation efficiency can be increased using the mixed-conducting oxide represented by the composition formula (1) and having high oxide ion conductivity.

Meanwhile, there is still another method of increasing permeation efficiency. It is to activate a surface of the oxide layer having oxide ion conductivity. In order to clarify the definition of activation, an oxygen permeating mechanism needs to be reviewed. As already described, the driving force of oxygen permeation is difference in oxygen partial pressure between two regions divided by the oxide which has oxide ion conductivity. However, an oxygen gas cannot permeate the mixed-conducting oxide in a form of oxygen molecules, and the gas can permeate the oxide after it becomes a state of oxygen ions. This means that the following reactions are involved: a reaction in which an oxygen molecule on the entering side adheres to a surface of the mixed-conducting oxide, separates into two oxygen atoms, and receive negative electric charges to become oxygen ions; and a reaction in which the oxygen ions release the negative electric charges on a surface of the mixed-conducting oxide on the issuing side and are bound into an oxygen molecule again. In other words, activation of the surface means to increase the speed of these reactions.

A method in which an active material is supported over the surface is considered to activate the surface, but a layer of a porous mixed-conducting oxide may be simply formed over the surface. This is because the porous layer increases a surface area of the mixed-conducting oxide, resulting in increase in reaction speed described above.

Accordingly, in the case of the hollow member having the structure in which the oxide ion permeable ceramic dense film is formed over the cylindrical porous ceramic base sealed at one end, it is most effective for increasing permeation efficiency to use the mixed-conducting oxide represented by the aforesaid composition formula (1) as the dense film and further form the active layer as described above over the dense film.

Any material is possible for the cylindrical porous ceramic base sealed at one end as long as it does not cause extreme reaction with the dense film formed thereon, but a desirable material is an oxide of the same system as the dense film formed thereon. The reason is that thermal expansivity of the dense film and the porous base is well matched and stress occurring in the dense film can be minimized so that an oxide ion permeable ceramic dense film of higher reliability can be formed.

In order to form the oxide ion permeable ceramic dense film over the cylindrical porous ceramic base sealed at one end, the porous ceramic base is first manufactured in the following manner. After the process from mixing of raw materials to calcination similarly to the normal ceramic synthesis, polyvinyl alcohol fine powders, for example, are mixed in the calcined powders to perform molding and firing. This is because the polyvinyl alcohol fine powders are removed by oxidation and vaporization in the firing step and a remaining ceramic part is sintered to form a robust network and become porous. Since the fine powders mixed in the calcined powders in manufacturing the porous ceramic base can be removed in the firing step in this manner, other organic compounds, carbon powders, a shell of walnut, or even sawdust may be used, not limited to polyvinyl alcohol. However, they are appropriately selected depending on the purpose because the particle size of these organic materials mixed in the calcined powders has the relationship with air permeability and mechanical strength of the porous ceramic base.

There are also various methods of forming the oxide ion permeable ceramic dense film formed over the porous ceramic base. For example, it is suitable that slurry obtained by dispersing the calcined powders in a solvent is applied on the porous ceramic base or the base is soaked in the slurry and thereafter fired, or it is also suitable that the calcined powders are deposited by an electrophoretic deposition method or the like and fired. Further, besides these wet methods, a thin film forming method such as CVD, which is a vapor deposition method, may be used.

The thinner oxide ion permeable ceramic dense film is better as long as it is such a perfect dense body as not to pass substances other than oxygen. Specifically, the thickness is 1 mm or smaller, preferably 0.1 mm or smaller, and most preferably 0.05 mm or smaller. The porosity of the cylindrical porous ceramic base over which the oxide ion permeable ceramic dense film is formed should be high enough not to prevent oxygen permeation and low enough not to cause significant degradation in mechanical strength. Specifically, the porosity should be not lower than 10% and not higher than 70%, preferably not lower than 20% and not higher than 60%, and most preferably not lower than 30% and not higher than 50%. Further, the thickness of the porous ceramic base needs to be small enough not to reduce permeation speed and large enough to sufficiently maintain mechanical strength as a supporting body. Specifically, the thickness is 20 mm or smaller, preferably 5 mm or smaller, most preferably 3 mm or smaller, and not smaller than 1 mm.

The flange member 12 may be formed of any material if it is a dense and heat-resistant article, and a wide range of materials such as stainless steel composed of iron, chrome, and nickel, a copper alloy, a heat-resistant alloy, or ceramic can be used. However, the material is assumed to be used at high temperature over 800° C., and therefore the restriction on the flange member 12 as a member is that degradation in terms of a structure member, such as extreme oxidation or melting of the member itself, is not caused under the high temperature conditions. Desirable materials are ceramic and the heat-resistant alloy, and the most desirable material is the same material as that of the hollow member 11. It is because thermal expansivity matches well and a heat cycle property is particularly excellent.

When ceramic is used for the flange member, proper usage depending on an electrical property (electronic conductivity, mixed conductivity, or an electrical insulating property) of ceramic becomes possible. For example, when electrical insulating ceramic is used for the flange member in the solid oxide fuel cell and appropriate wiring is provided, electric power can be taken out without a short circuit even if the composite bodies according to the present invention are directly integrated to a metallic reaction container.

Figure 4A:
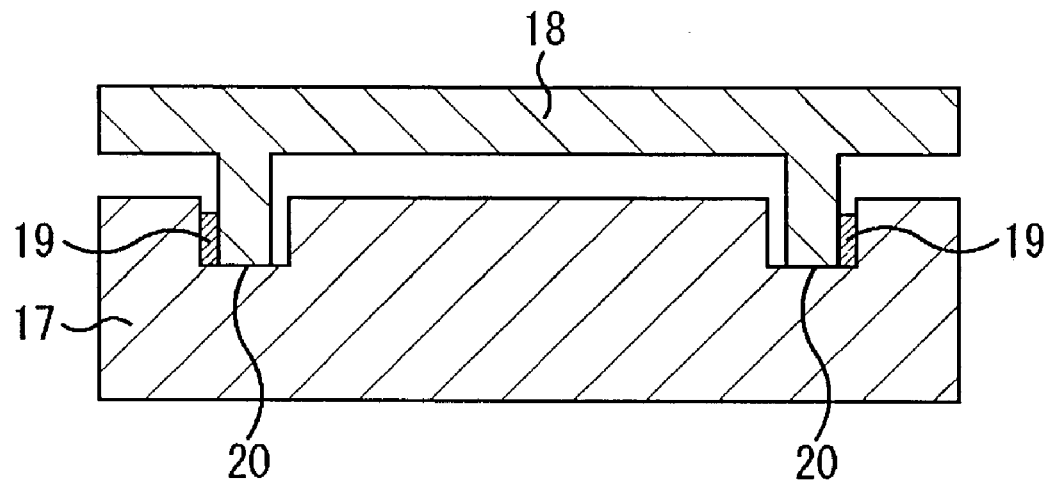
FIG. 4A and FIG. 4B show examples of a composite body including the structure in which a member having a circular concave part and made of metal or ceramic is combined with a member having a convex part capable of being inserted into the concave part and made of metal or ceramic, and each of the drawings is a schematic cross sectional view of a composite body of a structure constituted of plural members and a metal member.
Figure 4B:
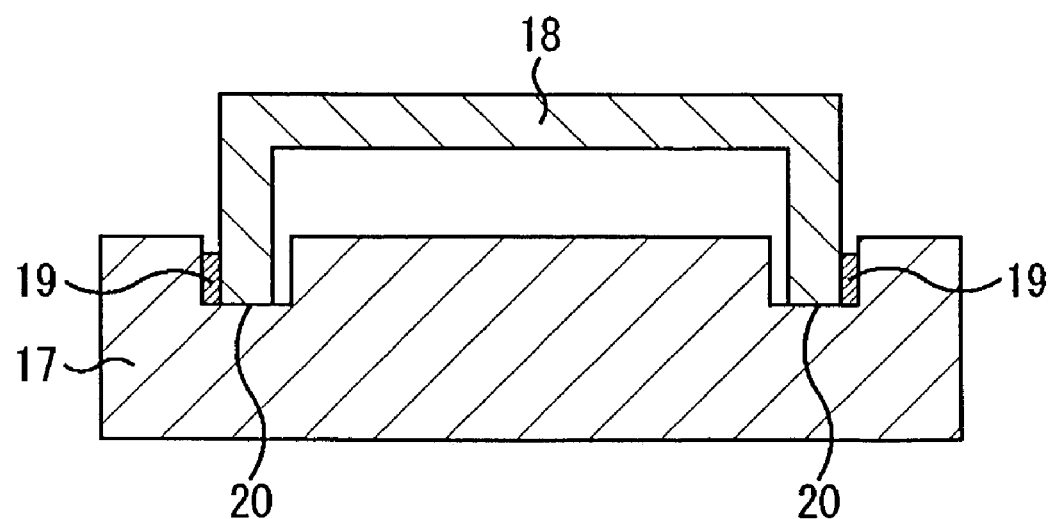

Shown in each of FIG. 4A and FIG. 4B is a schematic cross sectional view of a composite body in which a member 17 having a circular concave part and formed of metal or ceramic and a member 18 having a convex part which can be inserted into the concave part and formed of metal or ceramic are combined. In either of the drawings, a reservoir formed by inserting the convex part into the concave part is filled with silver or a silver alloy 19 so that a boundary part 20 between both members (17, 18) is sealed.

As shown in each of FIG. 1A to FIG. 4B, an upper surface of the metal member in the composite body of the present invention is a free surface. This structure offers an advantage that the metal member can be easily refilled when the metal member maintaining a sealing property decreases gradually and loses the sealing property because of the long-term usage even if sublimation speed of the metal member is quite slow. Further, wettability becomes very poor depending on combination of composite members and the metal member to be bonded in some cases. In extreme cases, the metal member cannot completely cover the boundary part and the sealing property is not obtained. In such a case, if an additive element for improving wettability is refilled and heat-treated again, wettability at the boundary part is improved and the sealing property is given, and the structure of the present invention can easily solve a problem like this.

The composite body of the present invention is desirably used at lower temperature than softening temperature of the metal member. This is because fluidity of the metal member is lost so that highly excellent resistance to pressure difference can be obtained. In order to use the composite body at lower temperature than softening temperature of the metal member, conversely, a metal member whose softening temperature is slightly higher than temperature at which the composite body is used should be appropriately selected. For example, when the composite body is used from approximately 800 to 900° C., silver or a silver alloy is preferably used.

Method of Manufacturing Composite Body

The composite body of the present invention can be manufactured in the following manner. Specifically, after combining the plural members to form the structure which has the reservoir, at least one kind of metal material selected from metal members or metallized members which soften at lower temperature than those of the members constituting the structure is inserted into the reservoir, and thereafter at least the reservoir is heated in a temperature range of not lower than softening temperature of the metal material and lower than softening temperature of the members constituting the structure so as to fill the metal material into the reservoir and at least a part of the combined boundary part between the members constituting the structure while curing the metal material. The reservoir prevents the metal material which contributes to the sealing property from flowing out at softening temperature.

Since the metal material is once fluidized by heat treatment and filled into the reservoir and at least a part of the combined boundary part between the members constituting the structure, it may be used in a form of ingots having proper size for the shape of the reservoir, powders, grains, or wires, or in any other forms. Further, clay including powders of metal to be inserted or slurry thereof may be used. In this case, processing of forming and softening the metal member may be separately performed, but continuous heat treatment makes it possible to fill the metal member into the reservoir and at least a part of the combined boundary part between the members constituting the structure without stopping.

Moreover, in the case of the composite body shown in each of FIG. 4A and FIG. 4B, it is also suitable that a gasket formed of metal which softens at lower temperature than those of the member 17 and the member 18 is inserted between contact surfaces of both members and heat-treated by the aforesaid method. This is because the metal member can be filled into the reservoir and at least a part of the combined boundary part between the members constituting the structure also in such a manner.

Structure of Oxygen Separation Device

Figure 5:
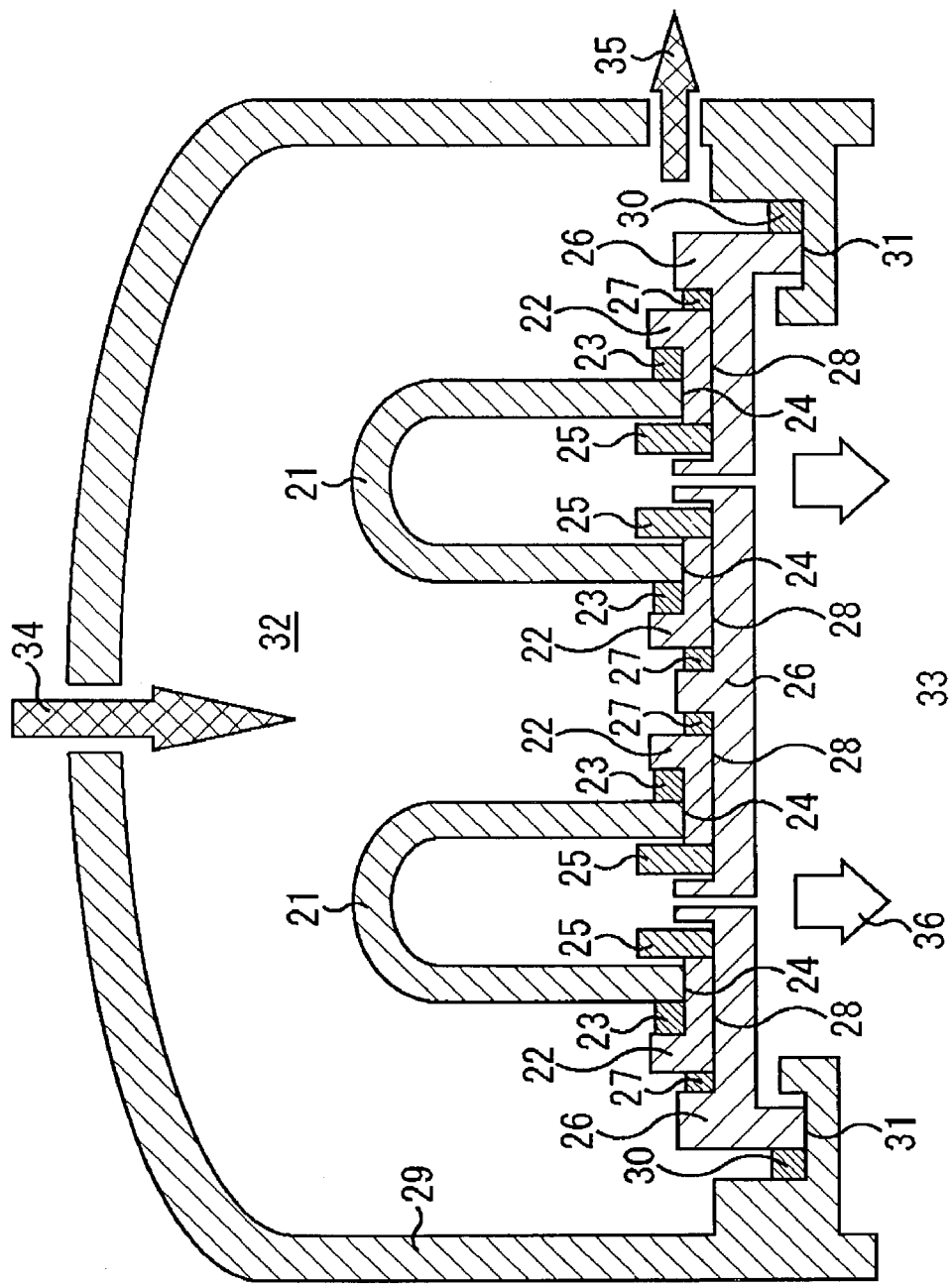
FIG. 5 is a schematic diagram showing an example of an oxygen separation device in which a composite body having a sealing property according to the present invention is used.

Next, an example of an oxygen separation device in which the composite body having the sealing property according to the present invention is used is shown in FIG. 5. This is an example of an oxygen production device for obtaining atmospheric pure oxygen by transporting preferably only oxygen ions from pressurized air. Although two composite bodies are illustrated in the drawing for convenience, the basic structure is the same even if more composite bodies are installed.

Each of hollow members 21 has the structure in which a boundary part 24 between a flange member 22 and the hollow member 21 is sealed with silver or a silver alloy 23. Further, this device has core members 25 which help fix of the hollow members 21 and prevent the silver or the silver alloys 23 from flowing out in the worst case. The structure constituted of 21 to 25 is mounted on an integration plate 26 and a boundary part 28 between the integration plate 26 and the structure is sealed with silver or a silver alloy 27. Furthermore, the integration plate 26 is mounted onto an oxygen separation container 29 and a boundary part 31 between the oxygen separation container 29 and the integration plate 26 is sealed with silver or a silver alloy 30.

This device has the structure in which combination of the composite bodies of the present invention divides the oxygen separation container 29 whose temperature is raised to high temperature (850° C., for example) into a region 32 and a region 33. In this device, the cylindrical hollow member 21 including an oxide ion permeable oxide layer and sealed at one end separates and collects oxygen from the region 32 to the region 33, and therefore partial pressure of oxygen existing in the region 32 should be set to be higher than partial pressure of oxygen in the region 33. For example, if the air pressurized to 1 MPa is introduced into the region 32, oxygen partial pressure in the region 32 becomes higher than 0.1 MPa, which enables separation and collection of oxygen in the atmospheric region 33 (atmospheric oxygen=0.1 MPa). At this time, since the three kinds of boundary parts (24, 28, 31) are sealed with the silver or the silver alloys (23, 27, 30), both regions (32, 33) are not mixed and oxygen of high purity is separated and collected. Then, fresh air is constantly supplied to the region 32 so that oxygen separation can be continued for a long period. A method of maintaining a fixed pressurized state while supplying the fresh air is realized by, for example, supplying the air pressurized by a booster from an inlet 34 at a fixed flow rate by a flow rate control device, and emitting oxygen-poor air whose oxygen concentration has lowered due to oxygen separation from an outlet 35 using a back-pressure valve (not shown).

The higher pressure of the pressurized air in the region 32 generates larger driving force of oxygen permeation so that separation speed can be increased but, if the pressure is excessively increased, pressure difference between both regions becomes too large and a risk of breakage of the members constituting the composite body arises. On the other hand, if the pressure of the pressurized air is excessively reduced, oxygen partial pressure becomes lower than 0.1 MPa and oxygen cannot be separated. Further, even if oxygen partial pressure is set to a level slightly higher than 0.1 MPa, the concentration of oxygen of the air side lowers by separation, which causes a state in which effective driving force of oxygen permeation is hardly generated. In order to avoid this state, an introduction amount of the supplied fresh air should be unlimitedly increased so that decrease in oxygen concentration becomes substantially negligible, but this is not realistic. Accordingly, the air pressure appropriate for oxygen separation (values inside the parenthesis indicate oxygen partial pressure) is not lower than 0.5 MPa (0.105 MPa) and not higher than 3 MPa (0.63 MPa), and more preferably not lower than 0.6 MPa (0.126 MPa) and not higher than 2 MPa (0.42 MPa).

The hollow member 21 having the oxide ion permeable oxide layer and sealed at one end may be formed preferably only of the oxide ion permeable oxide layer or may have the structure in which an oxide ion permeable ceramic dense film is formed over a cylindrical porous ceramic base sealed at one end as described above. Further, a repaired layer may be formed over the oxide ion permeable ceramic dense film. Furthermore, a porous layer aiming at activation of a surface may be formed over the surface of the dense film. In any case, the hollow member 21 is structured to transport preferably only oxide ions and not to pass other gas components.

In the example shown in FIG. 5, the flange member 22 and the integration plate 26 are formed of different materials and the silver or the silver alloy 27 is used for realizing the sealing property between them. This structure is applied because it is convenient assuming that maintenance (such as replacement) is performed to the composite body of the hollow member 21 and the flange member 22 as one unit. Meanwhile, when higher priority is placed on simplicity of the device structure than such convenience, 22 to 25 can be omitted by forming the structure in which the hollow member 21 is directly combined with the integration plate 26 and a boundary part is sealed with the silver or the silver alloy 27.

Structure of Membrane Reactor

Figure 6:
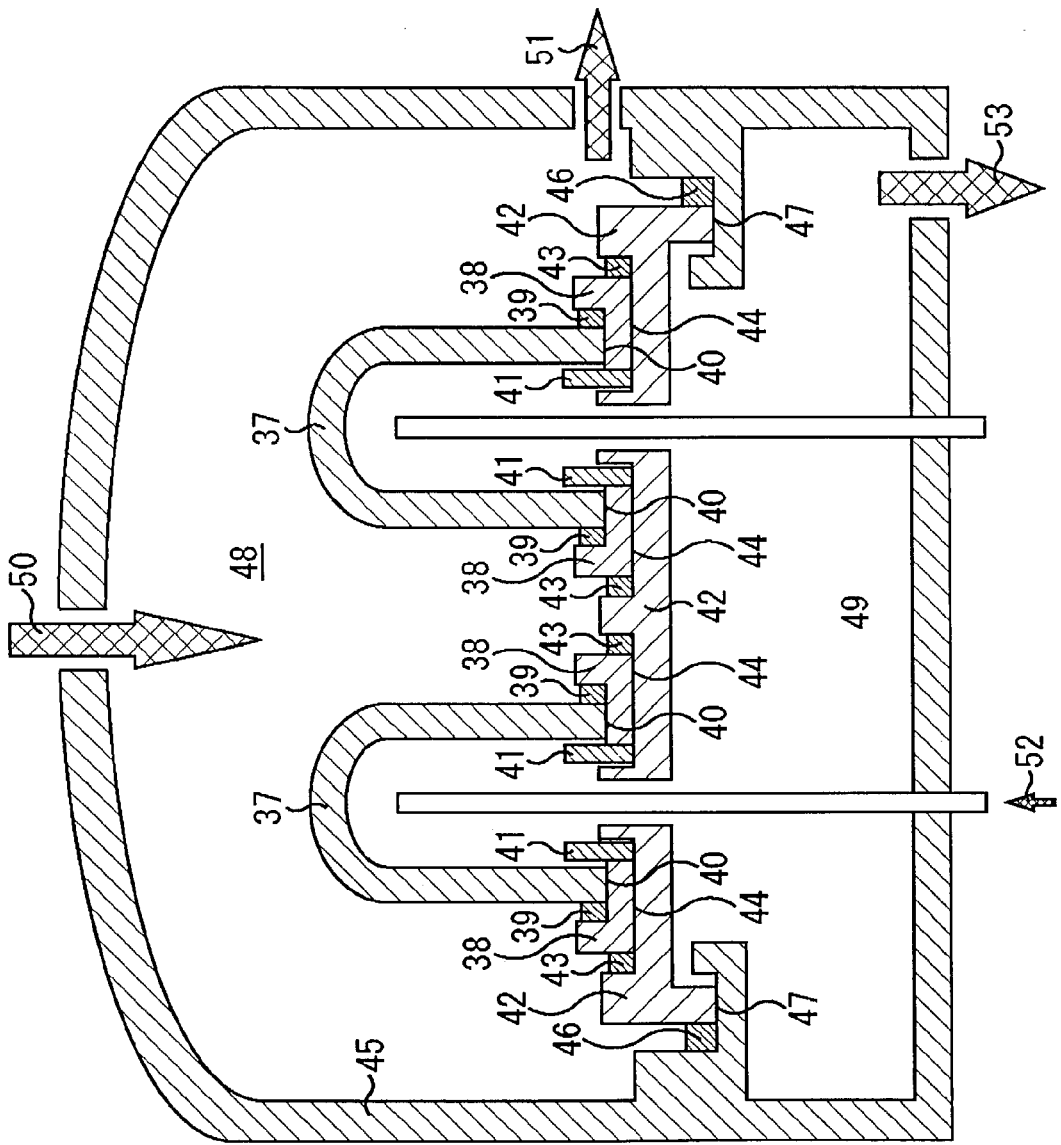
FIG. 6 is a schematic diagram showing an example of a membrane reactor in which the composite body having the sealing property according to the present invention is used.

Subsequently, an example of a membrane reactor in which the composite body having the sealing property according to the present invention is used is shown in FIG. 6. This is an example of a device for obtaining a synthesis gas (carbon monoxide and hydrogen) by segregating a natural gas mainly composed of methane and the air by an oxide ion permeable oxide and partially oxidizing methane by oxygen ions transported from the air side to the natural gas side at a surface of the oxide on the natural gas side. Although two composite bodies are illustrated in the drawing for convenience, the basic structure is the same even if more composite bodies are installed. Further, oxygen may be used in place of the air.

Each of hollow members 37 has the structure in which a boundary part 40 between a flange member 38 and the hollow member 37 is sealed with silver or a silver alloy 39. Further, this device has core members 41 which help fix of the hollow members 37 and prevent the silver or the silver alloys 39 from flowing out in the worst case. The structure constituted of 37 to 41 is mounted on an integration plate 42 and a boundary part 44 between the integration plate 42 and the structure is sealed with silver or a silver alloy 43. Furthermore, the integration plate 42 is mounted onto a reactor container 45 and a boundary part 47 between the reactor container 45 and the integration plate 42 is sealed with silver or a silver alloy 46.

This device has the structure in which combination of the composite bodies of the present invention divides the reactor container 45 whose temperature is raised to high temperature (850° C., for example) into a region 48 and a region 49. In this device, the air is supplied from an air inlet 52 and oxide ions pass through the hollow members 37, each of which has an oxide ion permeable oxide layer and is sealed at one end, to be transported to the region 48 side where the natural gas exists so that the natural gas is partially oxidized at surfaces of the hollow members 37. Since the region 48 is in a state in which oxygen partial pressure is extremely low because of the reducing gas, it may be either in an atmospheric state or in a pressurized state. Meanwhile, oxygen partial pressure in the region 49 side is extremely high as compared with the region 48, and therefore the region 49 may be pressurized or may be left as it is in an atmospheric state. At this time, if the sealing property of the composite body is poor, the gases in both regions are mixed in other places than the surfaces of the hollow members 37, which makes it impossible to control the gases into desirable reaction because complete oxidation reaction occurs or the like, or produces a risk of explosion caused by the mixing in the worst case. In the case of the composite body of the present invention, the three kinds of boundary parts (40, 44, 47) are sealed with the silver or the silver alloys (39, 43, 46), and therefore the device can be operated as a reactor of high efficiency.

When a fixed pressurized state is maintained while supplying the natural gas, it can be realized by, for example, supplying a pressurized natural gas from an inlet 50 at a fixed flow rate by a flow rate control device, and emitting a synthesis gas generated by partial oxidation from an outlet 51 using a back-pressure valve (not shown), similarly to the case of the oxygen separation device. On the other hand, when the fixed pressurized state is maintained while supplying the air, it can be realized by supplying the pressurized air from inlets 52 at a fixed flow rate by a flow rate control device and emitting oxygen-poor air which has not contributed to permeation through the hollow members 37 from an outlet 53 using a back-pressure valve (not shown).

There is no special restriction on pressure balance between the region 48 and the region 49 as in the case of the oxygen separation device. However, the natural gas introduced into the region 48 is originally supplied at high pressure and the collected synthesis gas is also used in the subsequent reaction as it is at high pressure in many cases, and the regions are operated in a pressurized state in such a case. It should be noted that a pressurization range is approximately 3 MPa or lower in general, and desirably approximately 2 MPa or lower, although it is selected considering a load on the reactor. On the other hand, it is desirable if the air introduced into the region 49 is pressurized to the same extent as the natural gas and introduced so that pressure difference between both regions can be minimized, but pressure conditions are appropriately determined because the pressurization causes increase in costs.

The hollow member 37 having the oxide ion permeable oxide layer and sealed at one end may be formed only of the oxide ion permeable oxide layer or may have the structure in which an oxide ion permeable ceramic dense film is formed over a cylindrical porous ceramic base sealed at one end as described above. Further, a repaired layer may be formed over the oxide ion permeable ceramic dense film. In any case, the hollow member 37 is structured to transport preferably only oxide ions and not to pass other gas components. Furthermore, a catalyst layer for partially oxidizing methane is formed over an outermost surface of the hollow member 37 on the natural gas side. Any catalyst layer may be used if it includes a material having catalytic activity. For example, a generally known material such as Ni or Ru is preferably used. In the example shown in FIG. 6, the flange member 38 and the integration plate 42 are formed of different materials and the silver or the silver alloy 43 is used for realizing the sealing property between them. This structure is applied because it is convenient assuming that maintenance (such as replacement) is performed to the composite body of the hollow member 37 and the flange member 38 as one unit. Meanwhile, when higher priority is placed on simplicity of the device structure than such convenience, 38 to 41 can be omitted by forming the structure in which the hollow member 37 is directly combined with the integration plate 42 and a boundary part is sealed with the silver or silver alloy 43.

As stated above, according to the present invention, a composite body having high reliability and an excellent sealing property can be provided at high temperature, which makes it possible to increase a possibility of practical use in a wide region which has been delayed in development owing to a bottleneck in improvement of the sealing property so far. In particular, the composite body is applied to a device for producing pure oxygen, oxygen-rich air or the like, a membrane reactor represented by that for partial oxidation of the hydrocarbon gas, a solid oxide fuel cell, an oxygen ion pump, an oxygen purification device, a heat exchanger, and the like, which can greatly contribute to acceleration in the development.

SPECIFIC EXAMPLES

Hereinafter effectiveness of the present invention will be clarified based on various specific examples.

Example 1

The oxygen separation device shown in FIG. 5 was actually assembled in the following manner.

Specifically, each of the hollow members 21 was made to have the structure in which the oxide ion permeable ceramic dense film is formed over the cylindrical porous ceramic base sealed at one end, and oxides of both of the dense film and the porous base were $SrCo_{0.9}Nb_{0.1}O_x$. SUS304 was used for the flange member 22 and the core member 25, and SUS310S was used for the integration plate 26 and the oxygen separation container 29. The dense film was formed to have thickness of approximately 50 μm over the porous bases using a slurry coating method. Silver clay was inserted into the reservoir formed by combining the plural members, and heat-treated at softening temperature of silver so that 23, 27, and 30 made of silver were formed.

When an experiment was conducted at 850° C. while maintaining pressure of the compressed air in the region 32 at 1 MPa, it has been confirmed that oxygen of 600 cc per minute was separated and generated. It has been found that purity of the obtained oxygen was approximately 98% and a nitrogen gas of 2% was mixed and, as a result of close tracking of the cause, an extremely small amount of gas leak has been noticed in the oxide ion permeable ceramic dense films of the hollow members 21.

Therefore, surfaces of the hollow members 21 except their open ends were soaked in the slurry used in the slurry coating method to reduce pressure inside the hollow members 21 so that a leak point was selectively repaired. The oxide ion permeable ceramic dense films of the hollow members 21 obtained by firing after the repair had unchanged thickness, and it has been confirmed that the films can separate oxygen at substantially the same speed and oxygen of 99.999% or higher purity has been successfully obtained while completely suppressing leak in a similar experiment to that described above. This has proved that a perfect sealing property could be realized at high temperature without any leak in the boundary parts existing in the composite body.

Further, when the experiment was conducted again at 850° C. after giving 10 times of heat cycles in which the oxygen separation device described above is cooled to room temperature and heated again to 850° C., it has been verified that the initial experiment can be perfectly reproduced.

Example 2

An optimum material of the composite body for getting the best performance from the device according to the present invention was searched. First, an oxide was formulated by the following method.

A prescribed amount of each of $La_2O_3$, $CaCO_3$, $SrCO_3$, $BaCO_3$, $Fe_2O_3$, $Co_3O_4$, $Nb_2O_5$, $Ta_2O_5$, $In_2O_3$, $SnO_2$, $V_2O_5$, $TiO_2$, $Cr_2O_3$, $MnO_2$, CuO, ZnO, NiO, $Li_2CO_3$, and MgO, which were used as a raw material of a specimen, was weighed and thereafter mixed by a ball mill for two hours together with a zirconia ball using ethanol as a carrier medium. The obtained slurry was dried, crushed, packed in a square sheath made of MgO, and calcined at 900° C. for 12 hours in the atmosphere. The obtained calcined powders were pulverized, packed into a dice of 12 mm Φ to be uniaxially molded, and further packed into an ice bag to be CIP molded. The obtained molded body was fired for five hours at optimal temperature within a temperature range from 1150 to 1300° C. in a square sheath made of MgO so that a disc-shaped sintered body of approximately 10 mm Φ was obtained. The optimal value of the firing temperature was individually determined from density and appearance of the obtained sintered body.

Although an evaluation criteria should be oxide ion conductivity fundamentally, it was replaced by evaluating oxygen permeation speed because, by making the thickness of the sintered body as large as 2 mm, the oxygen permeation speed can be controlled by diffusion, and proportionality is established between the oxygen permeation speed and the oxide ion conductivity. The conditions for evaluating the oxygen permeation speed are as follows.

Evaluation method: gas sweeping method, temperature: 850° C., Oxygen partial pressure of entering side: 21 kPa, oxygen partial pressure of issuing side: 1 kPa, thickness of specimen: 2 mm Results are shown in Table 1. The unit of permeation speed is cc/min·cm².

TABLE 1

| Chemical composition | Permeation speed | Crystal structure |
| --- | --- | --- |
| $La_{0.2}Sr_{0.8}Co_{0.9}Nb_{0.1}O_x$ | 1.38 | Stable |
| $SrCo_{0.9}Nb_{0.1}O_x$ | 1.92 | Stable |
| $Sr_{0.5}Ba_{0.5}Co_{0.9}Nb_{0.1}O_x$ | 1.98 | Stable |
| $Sr_{0.5}Ca_{0.5}Co_{0.9}Nb_{0.1}O_x$ | 1.75 | Stable |
| $Sr_{0.9}Co_{0.9}Nb_{0.1}O_x$ | 1.88 | Stable |
| $La_{0.1}SrCo_{0.9}Nb_{0.1}O_x$ | 1.75 | Stable |
| $SrCo_{0.7}Fe_{0.2}Nb_{0.1}O_x$ | 1.52 | Stable |
| $SrCo_{0.9}Ta_{0.1}O_x$ | 1.89 | Stable |
| $SrCo_{0.9}In_{0.1}O_x$ | 1.96 | Stable |
| $SrCo_{0.9}Sn_{0.1}O_x$ | 1.90 | Stable |
| $SrCo_{0.9}V_{0.1}O_x$ | 1.65 | Stable |
| $SrCo_{0.9}Ti_{0.1}O_x$ | 1.55 | Stable |
| $SrCo_{0.9}Cr_{0.1}O_x$ | 1.62 | Stable |
| $SrCo_{0.9}Mn_{0.1}O_x$ | 1.73 | Stable |
| $SrCo_{0.8}Nb_{0.1}Li_{0.1}O_x$ | 1.80 | Stable |
| $SrCo_{0.8}Nb_{0.1}Ni_{0.1}O_x$ | 1.83 | Stable |
| $SrCo_{0.8}Nb_{0.1}Cu_{0.1}O_x$ | 1.90 | Stable |
| $SrCo_{0.8}Nb_{0.1}Zn_{0.1}O_x$ | 1.75 | Stable |
| $SrCo_{0.8}Nb_{0.1}Mg_{0.1}O_x$ | 1.79 | Stable |
| $La_{0.6}Sr_{0.4}Co_{0.9}Nb_{0.1}O_x$ | 0.28 | Stable |
| $La_{0.6}Sr_{0.4}Co_{0.8}Nb_{0.1}Cu_{0.1}O_x$ | 0.42 | Stable |
| $SrCo_{0.5}Nb_{0.5}O_x$ | 0.38 | Unstable |
| $Sr_{0.8}Co_{0.9}Nb_{0.1}O_x$ | 0.88 | Unstable |
| $La_{0.1}Sr_{1.1}Co_{0.9}Nb_{0.1}O_x$ | 0.67 | Unstable |
| $SrCo_{0.4}Fe_{0.5}Nb_{0.1}O_x$ | 0.51 | Stable |
| $SrCo_{0.5}Nb_{0.1}Cu_{0.4}O_x$ | 0.62 | Stable |

As can be seen from Table 1, a mixed-conducting oxide having an exemplary chemical composition formula of the present invention has the stable crystal structure and high oxide ion conductivity.

Second Embodiment

In order to assemble a highly efficient applied device for oxygen transportation with high reliability and at low costs using plural oxygen transporting ceramic, ceramic-metal bonding for holding ceramic which has a function of transporting oxide ions onto a case of a device is inevitable.

The present invention is based on the fact that, as a result of study on bonding between mixed-conducting ceramic and a metal member, bonding between oxide ion conducting ceramic and a metal member, and bonding between electronic conducting ceramic and a metal member, it has been found that a ceramic-metal composite structure, in which a gas sealing property at high temperature is given to a bonded part and which is excellent in durability against repetition of high temperature and room temperature and maintainability, can be made using silver or a silver alloy for the bonded part.

Silver or the silver alloy is used for the bonded part between oxide ion conducting ceramic, mixed-conducting ceramic, or electronic conducting ceramic and the metal member so that stainless steel composed of iron, chrome, and nickel, a general heat-resistant alloy, or other various kinds of metal materials can be widely used for the metal member. The reason is that releasability at atmospheric temperature is maintained since silver or the silver alloy has high chemical stability and causes no secondary reaction with the metal member at high temperature in the bonded part. However, the metal material is limited to a material which does not cause degradation in terms of a structure member, such as extreme oxidation or melting of the metal member itself, under high temperature conditions (550° C. to 950° C., for example) because the applied device for oxygen transportation intended by the present invention is operated at high temperature.

Silver used as a bonding member is chemically stable metal as well as metal characterized in that it softens within an operation temperature range of the applied device for oxygen transportation used in the present invention. A sealing property is expected to be obtained by its softening. Further, silver has a linear thermal expansion coefficient of approximately $23 \times 10^{-6}/°$ C. which is a close value to that of oxygen transporting ceramic. Metal can be applied to the present invention as long as it has such characteristics, and the similar effect can be confirmed also from a bonding member made of a silver-based alloy. For example, gold, copper, and palladium are examples of alloyed elements useful for controlling softening temperature and the thermal expansion coefficient. Besides these metals, Zn, Cd, In, Sn, Mn, Ti, Co, Li, Cr, Fe, Ga, Ni, or the like may be added. Any kind and addition amount of the alloyed element can be selected unless the aforesaid characteristics of silver are substantially changed, but 35 mass % or more silver content is desirable in maintaining the characteristics of silver described above.

Figure 7:
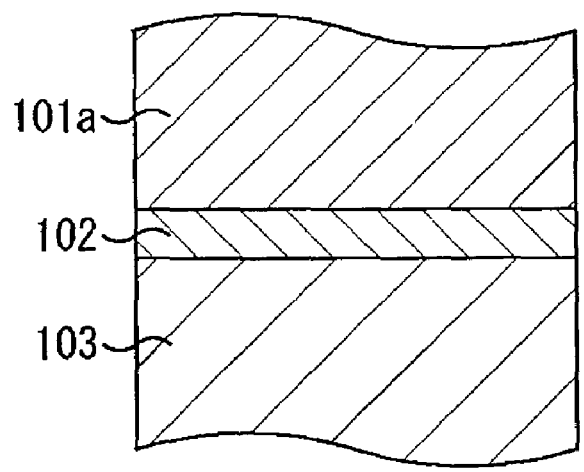
FIG. 7 is a partial cross sectional view showing a bonded portion in a ceramic-metal composite structure.

Next, one example of a ceramic-metal composite structure provided by the present invention is shown in FIG. 7. FIG. 7 illustrates a part of a cross section of a bonded portion and a shape of the ceramic-metal composite structure is not limited if it includes a bonded portion like this, and further, there is no problem if the composite structure is a composite body with other members. In FIG. 7, 101a denotes any of oxide ion conducting ceramic, mixed-conducting ceramic, and electronic conducting ceramic, 102 denotes silver or a silver alloy being a bonding material, and 103 denotes a metal member. Since this ceramic-metal composite structure has a metal part, a normal welding technique can be used for mounting the composite structure onto a metallic case of the applied device for oxygen transportation. Alternatively, the metal member 103 may be the metallic case itself of the applied device for oxygen transportation.

Figure 8:
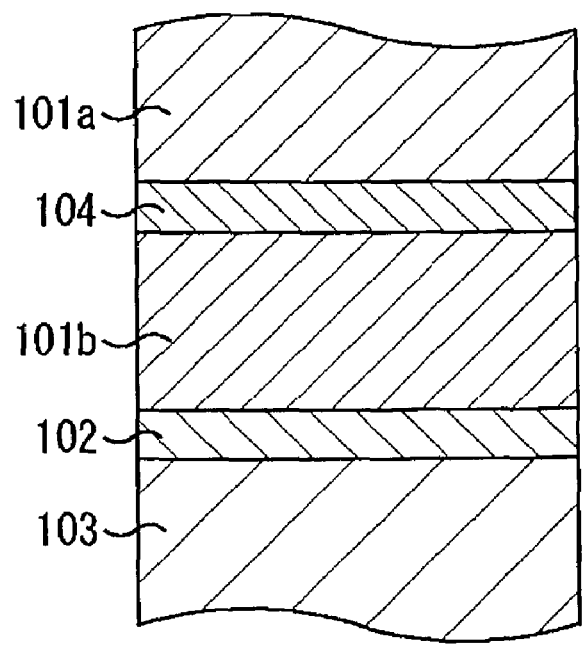
FIG. 8 is a partial cross sectional view showing a bonded portion in another ceramic-metal composite structure.

Another example of the ceramic-metal composite structure provided by the present invention is shown in FIG. 8. Similarly to FIG. 7, FIG. 8 illustrates a part of a cross section of a bonded portion. In FIG. 8, 101a and 101b denote any of oxide ion conducting ceramic, mixed-conducting ceramic, and electronic conducting ceramic, and 101a and 101b may be either the same type of ceramic or different types of ceramic. 101a and 101b is a bonded body bonded by a bonding material 104. This bonded body is bonded with a metal member 103 by a bonding member 102 made of silver or a silver alloy.

A material for ceramic—ceramic bonding, namely, the bonding material 104 between 101a and 101b may be made of silver or a silver alloy, but not limited to it. For example, the bonding may be performed using a "solid phase reaction method" in which slurry obtained by dispersing powders having the same composition as 101a or 101b in a solvent is applied on a bonded part and sintered.

Moreover, also as for a bonded body in which an oxide ion conducting ceramic dense body or a mixed-conducting ceramic dense body and a mixed-conducting ceramic porous body or an electronic conducting ceramic porous body are bonded, any bonding method such as the solid phase reaction method can be selected, not limited to the bonding by silver or the silver alloy.

Furthermore, any of the following cases shows one of bonding methods for obtaining the bonded body in which the oxide ion conducting ceramic dense body or the mixed-conducting ceramic dense body and the mixed-conducting ceramic porous body or the electronic conducting ceramic porous body are bond: a case in which slurry obtained by dispersing oxide ion conducting ceramic powders or mixed-conducting ceramic powders in a solvent is applied onto a surface of the mixed-conducting ceramic porous body or the electronic conducting ceramic porous body and sintered so as to newly form the oxide ion conducting ceramic dense body or the mixed-conducting ceramic dense body; a case in which slurry obtained by dispersing the mixed-conducting ceramic powders or electronic conducting ceramic powders in a solvent is applied onto a surface of the oxide ion conducting ceramic porous body or the mixed-conducting ceramic porous body and sintered so as to newly form the mixed-conducting ceramic porous body or the electronic conducting ceramic porous body; and so on. Incidentally, the ceramic, which is newly formed by application of the slurry obtained by dispersing the ceramic powders in the solvent and sintering, can be made into the dense body or the porous body ceramic by adjusting ingredients in the slurry and optimizing baking conditions.

The ceramic-metal composite structure of the present invention can be formed by sandwiching a silver or silver alloy gasket between bonded surfaces of ceramic or a ceramic bonded body and the metal member and conducting heat treatment at temperature of not lower than 550° C. and not higher than 950° C. while applying light pressure of, for example, approximately 3000 Pa from both sides of the ceramic side and the metal side.

This pressure applied to the ceramic and the metal member is not necessarily required to be applied intentionally because pressure of such an extent can be applied by the self weight of materials if the materials are bonded in a vertical position as will be described in Example 1 later. On the contrary, under conditions where excessively large force is exerted, softened silver is extruded from the bonded part and both an adhesive property and releasability lower in some cases. Accordingly, it is appropriate to set the applied pressure to approximately 1 MPa or lower.

The optimal heat treatment temperature is not lower than 550° C. and not higher than 950° C. although it somewhat changes depending on the type of the gasket such as, for example, a gasket processed from a clay sheet or a gasket processed from a metal sheet, or ingredients of the silver alloy. Gas leak cannot be suppressed in any combination at 550° C. or lower while, at a temperature of higher than 950° C., the structure having a poor gas sealing property is also made because the gasket becomes a melting (the melting point of silver is 961° C.) state and cannot be a bonded part having uniform thickness.

Although the ceramic-metal composite structure preferably used for the applied device for oxygen transportation can be obtained by the method described above, the composite structure does not have to be necessarily formed by heat treatment in advance if the device is operated in the range from 550° C. to 950° C. because, preferably only by sandwiching the gasket at room temperature and increasing the temperature to a predetermined value, bonding is completed and the obtained composite structure can be used as an intended composite structure as it is.

The gasket used in the present invention can be easily manufactured by cutting out a silver or silver alloy noble metal clay sheet into a ring shape.

A special material need not be used for the noble metal clay sheet and, for example, clay containing noble metal powders, a cellulose water-soluble binder, a surface-active agent, and the balance of water and inevitable impurities as disclosed in Japanese Patent Application Laid-open No. Hei 7-70604 is preferably used.

The gasket obtained by processing the noble metal clay sheet is characterized in that it can realize a gas seal at low temperature of 550° C. and has excellent maintainability for such reasons that it has a characteristic of moderately contracting in the process of gradually removing organic ingredients because it has excellent resilience, and that it is easily sintered because the noble metal powders dispersed in the clay are fine powders.

On the other hand, the gasket for the composite structure can be also obtained by cutting out a silver or silver alloy noble metal sheet into a ring shape although optimal heat treatment temperature becomes a little high as compared with that of the clay sheet.

An advantage of using the gasket processed from the silver or silver alloy noble metal sheet is that the costs can be reduced compared with the clay. No inferiority is seen in the sealing property and maintainability while the costs are reduced.

The gasket desirably has thickness of not smaller than 0.1 mm and not larger than 1 mm. It is because thickness of 0.1 mm or smaller is sometimes insufficient to cover roughness of the bonded surface on the ceramic side and causes a poor sealing property, while thickness of 1 mm or larger sometimes causes unexpected drip when heat treatment temperature is close to the melting point of the gasket, which impairs releasability.

Figure 9:
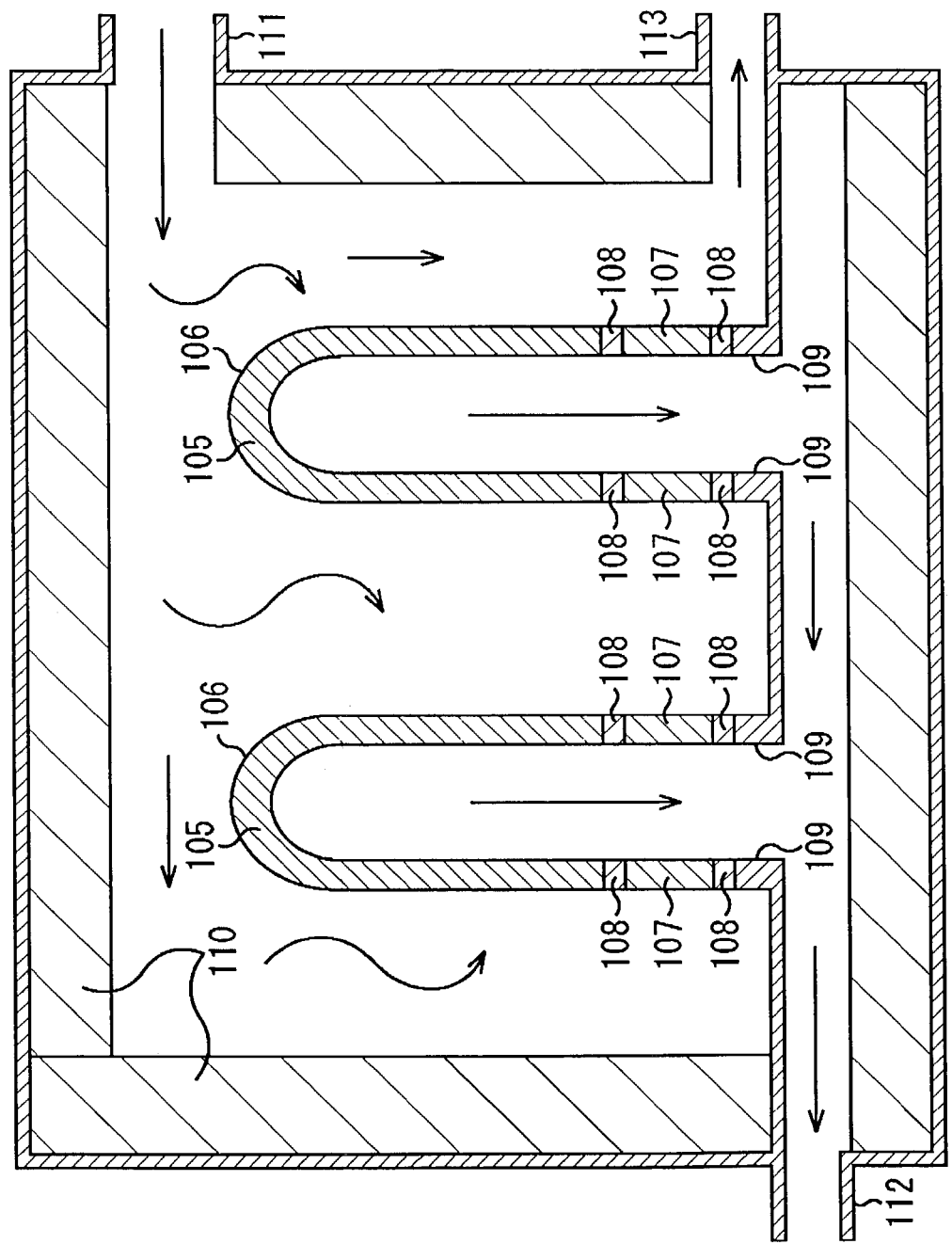
FIG. 9 is a conceptual schematic diagram showing an oxygen production device in which plural oxygen transporting ceramic-metal composite structures are used, as an example of an applied device for oxygen transportation.

An example of an applied device for oxygen transportation in which a plurality of the ceramic-metal composite structures according to the present invention are used is shown in FIG. 9. This is an example of an oxygen production device for obtaining atmospheric pure oxygen by transporting preferably oxide ions from the pressurized air. FIG. 9 illustrates two ceramic-metal composite structures for convenience, but any number of the structure can be included.

Bonded bodies in each of which a mixed-conducting ceramic dense body 106 is thinly formed over a surface of a tubular mixed-conducting ceramic porous body 105 sealed at one end, are bonded with mixed-conducting ceramic dense bodies 107 by silver 108. They are further bonded with stainless (SUS310S) tubes 109 via silver 108 to be held by a case. In this example, the stainless (SUS310S) tubes 109 themselves compose a part of the case. The ceramic-metal composite structures are contained in thermal insulators 10 and the compressed air heated to 850° C. is introduced from an inlet 111 into a reaction chamber so that the ceramic-metal composite structures are maintained at high temperature. Oxide ions permeate the mixed-conducting ceramic dense bodies 106 from the air introduced from the inlet 111 and the obtained pure oxygen is collected from a collection port 112. Further, oxygen-poor air whose oxygen partial pressure has lowered is emitted from an outlet 113.

SPECIFIC EXAMPLES

Hereinafter, effectiveness of the present invention will be clarified based on various specific examples.

Example 1

32.44 g of Strontium carbonate, 8.79 g of tricobalt tetroxide, and 8.77 g of iron oxide were weighed so as to make the composition of $SrCo_{0.5}Fe_{0.5}O_x$, and mixed by a ball mill in 120 g of isopropyl alcohol. After mixing of two hours, they were dried to remove isopropyl alcohol, and calcined for 12 hours at 900° C. The obtained calcined powders were molded at isostatic pressure of 200 MPa into a tubular shape sealed at one end, and fired for five hours at 1200° C. in the atmosphere.

Thus obtained was a tubular mixed-conducting ceramic tube sealed at one end and having the outer diameter of 13 mm, the inner diameter of 9 mm, and the length of 50 mm. Aside from this tube, a gasket was prepared which is obtained by cutting out a silver clay sheet whose thickness is 0.3 mm into a ring shape having the outer diameter of 13 mm and the inner diameter of 9 mm using a cork borer. An SUS310S tube processed to have the outer diameter of 13 mm and the inner diameter of 9 mm was placed vertically, the gasket was set thereon, and the tubular mixed-conducting ceramic tube sealed at one end was placed vertically to sandwich the gasket so that the structure was disposed in a straight line. On the gasket part, approximately 3500 Pa of pressure by the self weight of the tubular mixed-conducting ceramic tube sealed at one end was exerted. The structure was heated in the atmosphere for three hours from room temperature to 850° C. and cooled down for three hours from 850° C. to room temperature.

The obtained ceramic-metal composite structure was confirmed to have an excellent adhesive property because it was not detached even when it was laid horizontally so as to exert its weight on bonded parts. Further, when force was given to try to separate the bonded parts, the ceramic and the silver gasket, and the silver gasket and the SUS310S could be clearly separated, which proves excellent releasability.

Example 2

Figure 10:
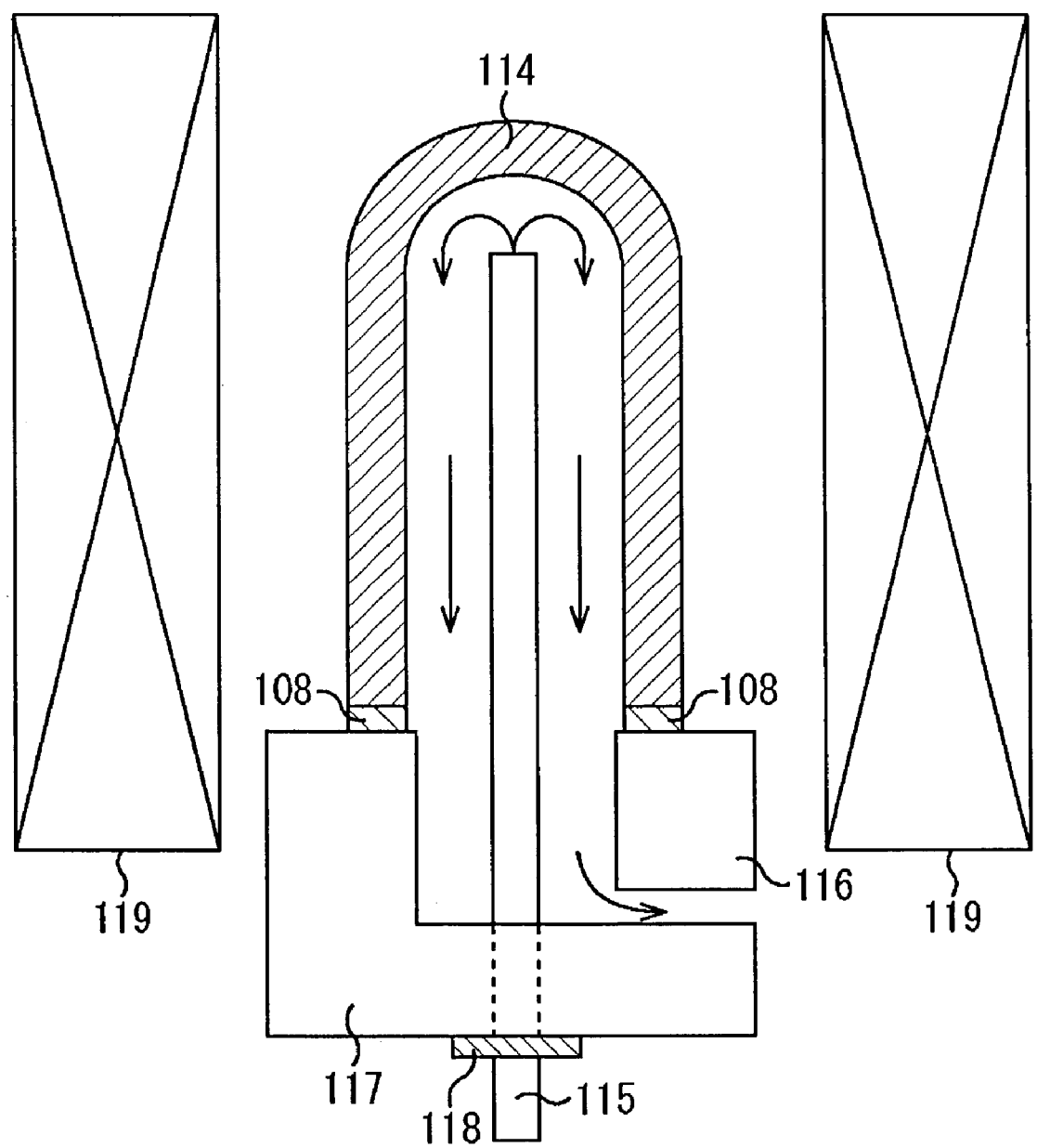
FIG. 10 is a schematic diagram of a device used for evaluating a gas sealing property.

The SUS310S tube, gasket, and tubular mixed-conducting ceramic tube sealed at one end, which were prepared in Example 1, were disposed in a straight line and heated in the atmosphere for three hours from room temperature to 850° C. to evaluate a gas sealing property at the temperature. A schematic diagram of a device used for evaluation is shown in FIG. 10. A helium gas was introduced through an alumina tube 115 which had been inserted to the inside of a tubular mixed-conducting ceramic tube 114 sealed at one end, and a gas emitted from an outlet 116 was analyzed by a gas chromatograph. It should be noted that, when the alumina tube 115 penetrated a case 117 of the device to be inserted, an epoxy adhesive 118 was used to prevent gas leak at the portion. As a result, an oxygen gas which had permeated mixed-conducting ceramic was detected besides helium in the issued gas, but other gases such as nitrogen gas indicating the access of atmosphere from outside could not be detected. This proves that the gas sealing property was excellent.

Example 3

A ceramic-metal composite structure obtained by the similar processing to Example 1 was heat-treated again to evaluate durability against repetition of room temperature and high temperature (850° C.). The operation was repeated up to 10 times at maximum and a gas sealing property at high temperature was checked similarly to Example 2 at the final 10th time repetition. As a result, an excellent gas sealing property was confirmed. Thereafter, the structure was cooled down to room temperature to conduct the similar evaluation to Example 1, which resulted in excellence in both adhesive property and releasability. From these results, it has been verified that the ceramic-metal composite structure of the present invention is excellent in repetition durability.

Example 4

An effect of heat treatment temperature for obtaining the ceramic-metal composite structure of the present invention was studied. The SUS310S tube, gasket, and tubular mixed-conducting ceramic tube sealed at one end, which were prepared in Example 1, were disposed in a straight line, heated in the atmosphere for three hours from room temperature, and cooled to a predetermined temperature, and cooled to check a bonding state. The heat treatment temperature was set from 400° C. to 1000° C. in increments of 50° C. As a result, no adhesive property was seen and an effect intended by the present invention could not be obtained at temperature of 500° C. or lower, but an excellent adhesive property could be confirmed at temperature of not lower than 550° C. and not higher than 950° C. Further, when the heat treatment temperature was raised to 1000° C., the obtained composite structure was degraded in releasability and broken in a ceramic surface part near a bonded surface which was fused with a silver bonding part.

Example 5

A bonding property between yttria stabilized zirconia (YSZ) which is oxide ion conducting ceramic, $La_{0.3}Sr_{0.7}CoO_x$ (LSC) which is mixed-conducting ceramic, and $La_{0.9}Sr_{0.1}MnO_x$ (LSM) which is electronic conducting ceramic, and three types of SUS310S, YUS731, and Incoloy800 as metal members was studied using a gasket processed from a silver clay sheet. A commercially available product was used as YSZ and products synthesized using a sintering method as in Example 1 were used as LSC and LSM. Results of evaluation similarly conducted to Example 3 are shown in Table 2. In the table, ○ indicates that resistance, namely a gas sealing property, an adhesive property, and releasability were not deteriorated even when the operation was repeated up to 10 times. As a result, it was found that any of the composite structures related to the present invention is excellent in repetition durability.

TABLE 2

Durability against repetition in various bonding

|  | SUS310S | YUS731 | Incoloy800 |
| --- | --- | --- | --- |
| YSZ | ○ | ○ | ○ |
| LSC | ○ | ○ | ○ |
| LSM | ○ | ○ | ○ |

Example 6

The composition of a silver alloy of a gasket used for the present invention was variously changed and its suitability as a bonding material for the object of the present invention was studied. Alloys whose silver/copper weight ratios vary in a range from 9:1 to 1:9 were first made and formed into a sheet to obtain gaskets. Their adhesive properties and releasability were evaluated by the similar method to Example 1 and their gas sealing properties were evaluated by the similar method to Example 2. As a result, it was found that the gas sealing property and adhesive property were excellent when the silver/copper weight ratio was from 9:1 to 2:8 while releasability was degraded when the ratio becomes smaller than 3.5:6.5. The reason was turned out that chemical stability of silver cannot not be efficiently exerted when silver content becomes 35 mass % or less.

Example 7

The similar study to Example 6 was conducted for other additive elements than copper, namely, gold, palladium, zinc, and cadmium. It was verified that any of the additive elements has excellent characteristics in an adhesive property, releasability, and a gas sealing property when they have silver content of 35 mass % or more.

Hereinafter, in order to compare with the examples of the present invention, evaluation of the similar experimentations to the examples was attempted concerning a conventional ceramic-metal composite structure.

Comparison Example 1

A bonding method between an La—Sr—Co—Fe oxide and a mullite tube reported by Teraoka and joint researchers (Bulletin of the Chemical Society of Japan 7th issue published in 1988, pp. 1084 to 1089) was performed, and the similar evaluation of an adhesive property and releasaiblity to Example 1 and the similar evaluation of repetition durability to Example 3 were conducted.

A sintered body having the composition of $La_{0.2}Sr_{0.8}Co_{0.4}Fe_{0.6}O_x$ was made as a representation of the La—Sr—Co—Fe oxide, and a silver wire of 1 mm Φ was formed into a ring shape, fixed between the millite tube and the sintered body with silver paste, and heat-treated at the melting temperature of silver. As a result, the adhesive property was excellent while releasability was poor and ceramic could not be separated without breakage. Further, as for repetition durability, a gas sealing property was lost at the third time repetition, and the study of its cause has revealed that micro-cracking had occurred in a ceramic part near the bonding.

Comparison Example 2

Similarly to Comparison Example 1, bonding methods in conventional arts were performed in order to confirm whether or not the conventional arts described in the specification have the properties intended by the present invention, and the similar evaluation of an adhesive property and releasaiblity to Example 1 and the similar evaluation of repetition durability to Example 3 were conducted. The results are shown in Table 3. Since any of the arts turned out not to have durability against repetition of up to 10 times, the numbers of times until when the repetition durability existed are shown by numerals in a repetition durability column in the table.

TABLE 3

| | Bonding properties in conventional arts | | | |
|---|---|---|---|---|
| | oxide-bonding member-bonded article | Adhesive property | Releasability | Durability |
| Kim et al. | $SrCo_{0.8}Fe_{0.2}$-gold-quartz | Δ | ○ | 3 |
| Bouwmeester et al. | $La_{0.3}Sr_{0.7}CoO$-glass-quartz | ○ | Δ | 1 |
| Ito et al. | $La_{0.5}Sr_{0.5}CoO$-ceramic bond-alumina | ○ | | 1 |

From Table 3, it was confirmed that the conventional arts do not have bonding properties applicable to the applied device for oxygen transportation.

Third Exemplary Embodiment

The present invention is a composite structure for transporting oxide ions constituted of a main part and a flange, and it is a composite structure in which the main part and the flange are formed of different materials to give different functions to the main part and the flange, and bonded. The main part has the structure in which an oxide ion transporting ceramic dense film thinly covers a porous ceramic base, and the flange is made of dense electronic conducting ceramic, oxide ion transporting ceramic, or electrical insulating ceramic.

First, the main part is given a function of transporting oxide ions selectively with high efficiency. Oxide ions are selectively transported using oxide ion transporting ceramic, and oxide ions are transported with high efficiency by thinning the oxide ion transporting ceramic into a dense film. Then, the dense film is formed over the porous ceramic base so that mechanical strength is maintained. The thinner oxide ion transporting ceramic dense film is better as long as two kinds of mixed gases having different oxygen partial pressures can be segregated. Specifically, the thickness is 1 mm or smaller, preferably 0.1 mm or smaller, and most preferably 0.05 mm or smaller. The ceramic base over which the dense film is formed is porous, and its porosity should be high enough not to prevent transportation of an oxygen element and low enough to support the dense film without causing significant degradation in mechanical strength. Specifically, the porosity is not lower than 10% and not higher than 70%, preferably not lower than 20% and not higher than 60%, and most preferably not lower than 30% and not higher than 50%. The smaller thickness of the porous ceramic base is better in order not to prevent transportation of the oxygen element while the base need be thick enough to sufficiently maintain mechanical strength as a supporting body. Specifically, the thickness is 20 mm or smaller, preferably 5 mm or smaller, and most preferably 3 mm or smaller.

Further, another layer may be included depending on the purpose as long as it is made of a material which does not suppress transportation of the oxygen element.

On the other hand, the flange is given the following three functions. Namely, (1) Reinforcement of mechanical strength (2) Offer of fixing unit (3) Electrical property function.

Figure 11A:
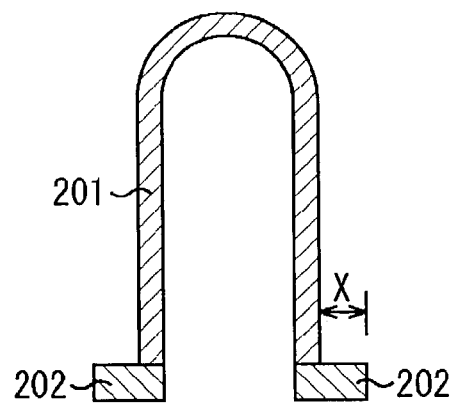
FIG. 11A to FIG. 11C are cross sectional views showing preferred specific examples of a composite structure for transporting oxide ions.
Figure 11B:
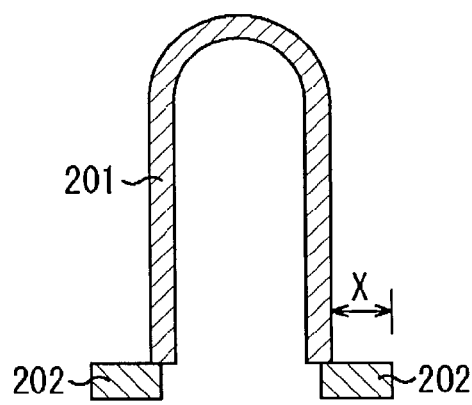
Figure 11C:
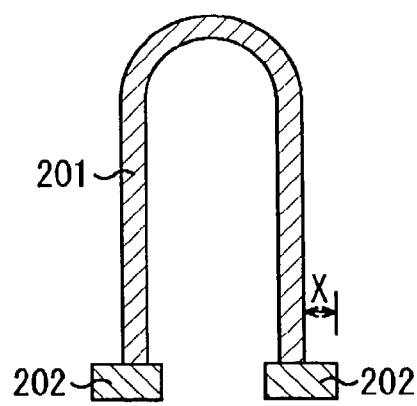
Figure 12:
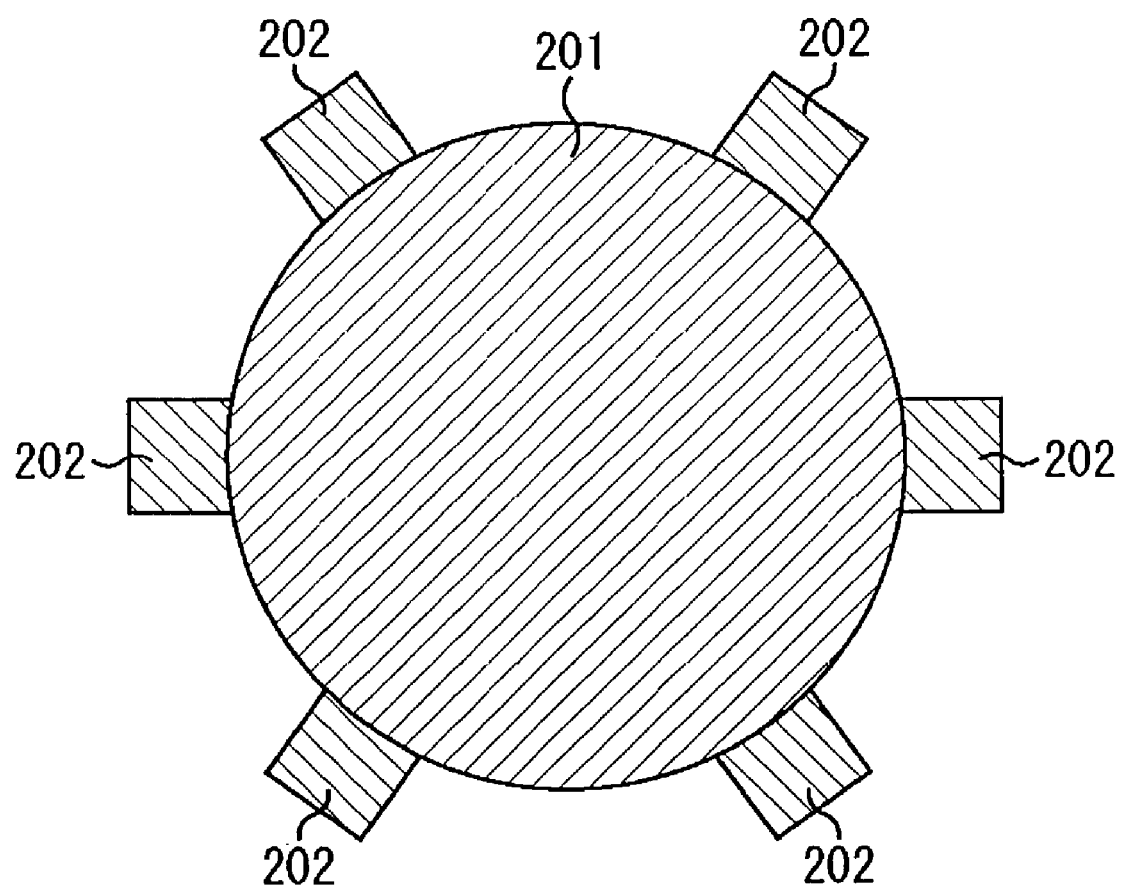
FIG. 12 is a schematic plan view of a composite structure for transporting oxide ions, and shows one example of the structure in which a part of a flange is discontinuously larger than the outer dimension of a tubular main part in a long diameter direction.

A preferred specific example of the composite structure disclosed by the present invention is shown in each of FIG. 11A to FIG. 11C for explaining these three functions. FIG. 11A shows a cross section of a tubular body in which a flange is bonded with the entire bottom surface of a main part. Although the main part and the flange have the same inner diameter and the flange has the larger outer diameter than the outer diameter of the main part by the length denoted by x in this case, the main part and the flange need not have the same inner diameter and, for example, the structures shown in FIG. 11B and FIG. 11C are also possible. It should be noted that the main part and the flange are bonded so that bonding strength therebetween can be maintained in FIG. 11B. Incidentally, horizontal cross sections of the main part and the flange have a concentric shape and their relative positions to be bonded also have the relationship in position concentric with the same center axis in the example of each of FIG. 11A to FIG. 11C, but the relationship in position may be eccentric in which the center axes of the concentric circles deviate from each other or the horizontal cross section of each of the main part and the flange may have a deformed shape from the concentric shape as long as the outer dimension of a part or the whole of the flange in its radial direction is larger than the outer dimension of the tubular main part in its long diameter direction. Further, the composite structure of the present invention may have the structure in which a part of the flange is discontinuously larger than the outer dimension of the tubular main part in its long diameter direction when it is seen from above, as shown in FIG. 12.

Next, the three functions given to the flange will be explained.

(1) Reinforcement of mechanical strength means to further reinforce mechanical strength which substantially depends on the porous ceramic base. For this purpose, dense ceramic excellent in mechanical strength is used for the flange.

(2) Offer of fixing unit means to offer a unit for fixing a tubular composite structure constituted of bonded main part and flange to a metallic reaction container as will be described later. For this purpose, the outer dimension of a part or the whole of the flange in its radial direction should be larger than the outer dimension of the main part in its long diameter direction. Although the extent to which the outer dimension should be made large depends on the type of an applied device for oxide ion transportation or performance to be given, it is selected in a range in which x in each of FIG. 11A to FIG. 11C, which denotes the length from the outer dimension of the main part in its long diameter direction to the outer dimension of the flange in its radial direction, is not shorter than 2 mm and not longer than 200 mm.

Here, a method of offering the fixing unit by the flange will be explained with reference to each of FIG. 13A and FIG. 13B to clarify the reason for selecting x in the range from 2 to 200 mm.

Figure 13A:
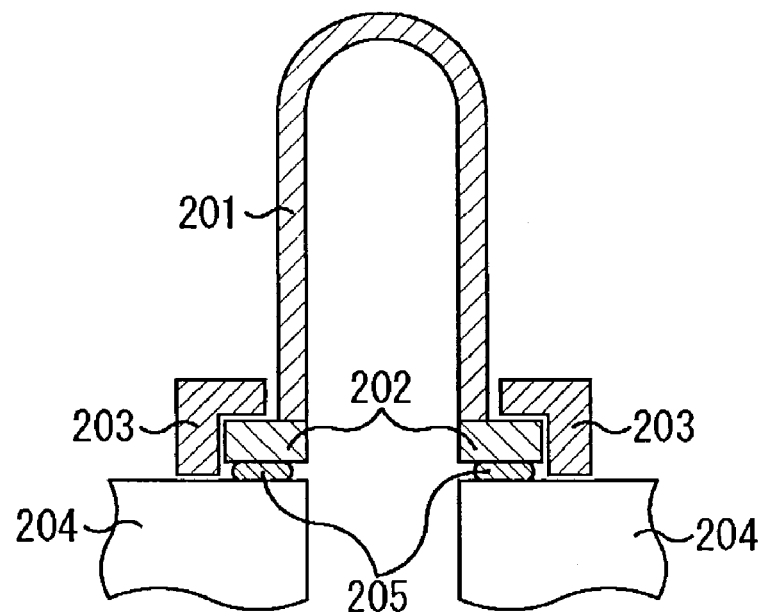
FIG. 13A and FIG. 13B are conceptual schematic diagrams showing a method of fixing the composite structure for transporting oxide ions to a reaction container.
Figure 13B:
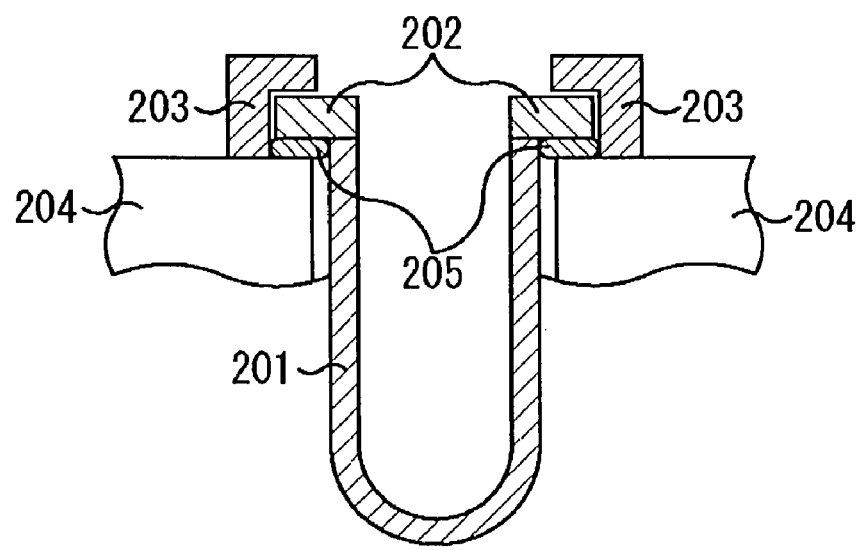

Each of the drawings of FIG. 13A and FIG. 13B takes the structure in FIG. 11A, which has been shown as the preferred specific example of the composite structured disclosed by the present invention, as the representative structure and conceptually shows a method of fixing it. In each of FIG. 13A and FIG. 13B, a composite structure in which a main part 201 and a flange 202 are bonded is bonded with a metal member 204 by a bonding member 205 and a fixing jig 203 is used as a means for fixing it. The fixing jig 203 may be bonded with the metal member 204 by welding, screwing, or any other methods, but the composite structure can be also fixed preferably only by the self weight of the fixing jig 203 and, in this case, the fixing jig 203 and the metal member 204 do not come into contact with each other.

As is clarified from FIG. 13A and FIG. 13B, the outer dimension of a part or the whole of the flange in its radial direction is made larger than the outer dimension of the main part in its long diameter direction, which enables use of the fixing jig 203 and facilitates the fixing. However, when the value of x is smaller than 2 mm, the composite structure is detached in some cases, which means insufficient fixing, because a contact area between the flange 202 and the fixing jig 203 is not sufficient in the case of FIG. 13A and because a contact area between the flange 202 and the metal member 204 is not sufficient in the case of FIG. 13B. Meanwhile, indiscriminately making x large causes a trouble in integration while, when x exceeds 200 mm, an effect of the present invention associated with integration becomes not prominent.

(3) Electrical property function means a function obtained in giving an electrical property to the flange. A specific example in a case of a solid oxide fuel cell is shown in each of FIG. 14A to FIG. 14C.

Figure 14A:
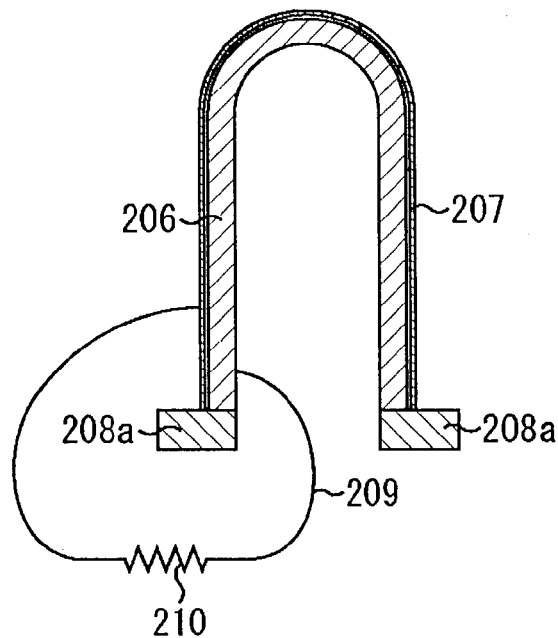
FIG. 14A to FIG. 14C are schematic diagrams showing examples of a solid oxide fuel cell in which the composite structure for transporting oxide ions is used.

FIG. 14A shows the composite structure shown in FIG. 11A which is constituted of a main part 206, in which an oxide ion conducting dense film is formed over a mixed-conducting porous ceramic base, and a flange 208a, and an electronic conducting porous layer 207 is further formed over a surface of the main part. This composite structure has a tubular body, and mixed gases having different oxygen partial pressures are supplied to the inside and the outside thereof. For example, supposing that a mixed gas having high oxygen partial pressure is supplied to the outside and a mixed gas having low oxygen partial pressure is supplied to the inside, positive potentials are generated at a surface of the electronic conducting porous layer 207 and negative potentials are generated at a surface of the mixed-conducting porous ceramic base and, if respective of them are taken out as terminals, they can be used as a battery. In this battery structure, the flange 208a is made of dense insulating ceramic so that a metal member is not included in a battery circuit, and therefore it is also possible to use the metal member as a reaction container of the device as it is.

Figure 14B:
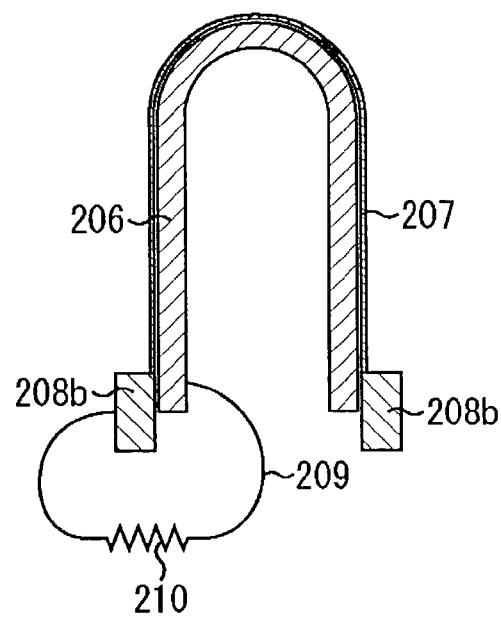
Figure 14C:
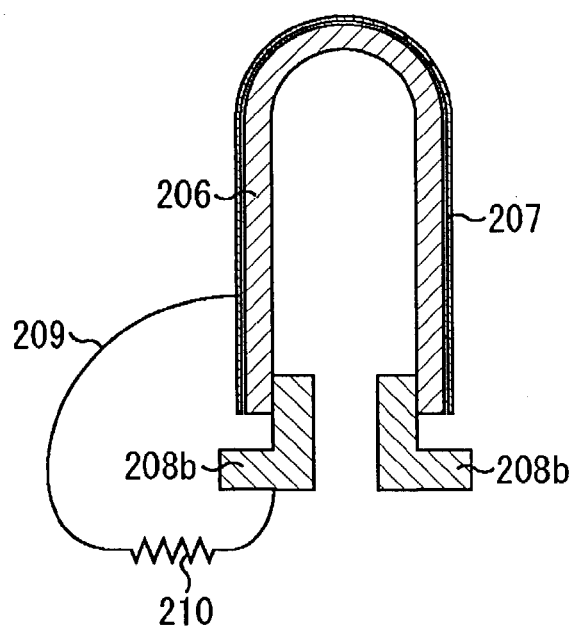

Structures shown in FIG. 14B and FIG. 14C can be considered when a battery is structured using the metal member as a battery circuit. Dense electronic conducting ceramic or mixed-conducting ceramic is used for a flange 208b and the flange functions as an electrode in this case. Since the metal member is a part of the battery circuit, electrical insulation is provided between the reaction container of the device and the metal member when the metal member is fixed to the reaction container.

As stated above, the electrical property which the flange should have in the present invention is any of electronic conductivity, an oxide ion transporting property, and an electrical insulation property. Incidentally, an electrical property to be given to the flange is appropriately selected depending on the application of the composite structure or the use thereof.

As described above, the object of the present invention is achieved preferably only after the flange is given the three functions, namely, (1) reinforcement of mechanical strength, (2) offer of fixing unit, and (3) electrical property function. Further, in order to give the three functions to the flange, the flange should be dense electronic conducting ceramic, oxide ion transporting ceramic, or electrical insulating ceramic. For example, when it is tried to assemble the applied device for oxide ion transportation preferably only from the main part of the present invention without the flange, the following problems cannot be solved: ① a ceramic part is easily broken because the main part does not have large mechanical strength and it cannot absorb difference in thermal expansion coefficient between metal and itself, ② integration becomes difficult due to lack of a fixing unit, ③ an electric circuit should be newly added in the reaction container side, which complicates the device, and so on. Also when metal is used for the flange, ① and ③ cannot be solved.

Here, another preferred specific example of the composite structure disclosed by the present invention besides the drawings of FIG. 11A to FIG. 11C is shown in each of FIG. 15A to FIG. 18C. Similarly to the diagrams of FIG. 11A to FIG. 11C, each of the drawings shows a cross section of a tubular body and x in the drawing denotes the length from the outer dimension of the main part in its long diameter direction to the outer dimension of the flange in its radial direction.

Figure 15A:
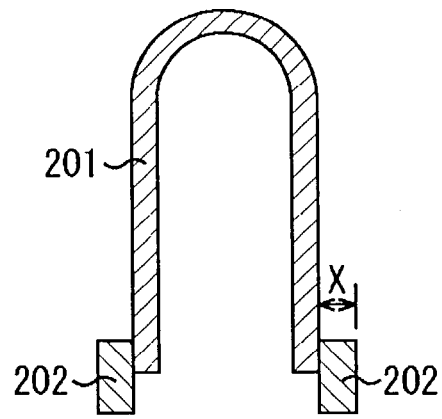
FIG. 15A to FIG. 15C are cross sectional views showing another preferred specific examples of the composite structure for transporting oxide ions.
Figure 15B:
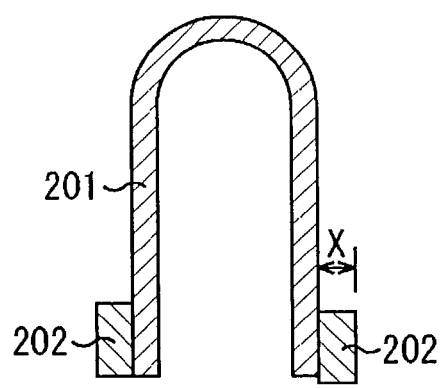
Figure 15C:
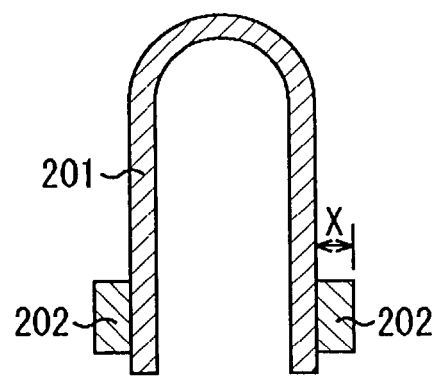

Each of the drawings of FIG. 15A to FIG. 15C shows the structure in which an outer surface of the main part is bonded with the flange, and FIG. 15A shows the structure taken as an example of the solid oxide fuel cell in aforesaid FIG. 14B. The structure in which the entire surface of the flange is bonded with the main part as in FIG. 15B and FIG. 15C is advantageous in terms of bonding strength as compared with the structure in FIG. 15A, but the structure in FIG. 15A is also possible as long as bonding strength can be sufficiently secured.

Figure 16A:
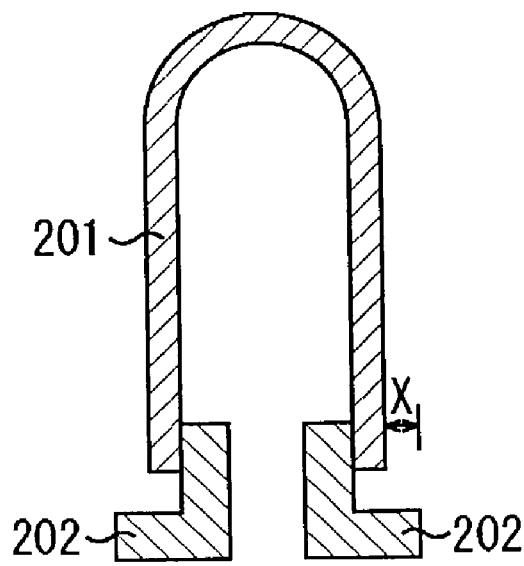
FIG. 16A and FIG. 16B are cross sectional views showing still another preferred specific examples of the composite structure for transporting oxide ions.
Figure 16B:
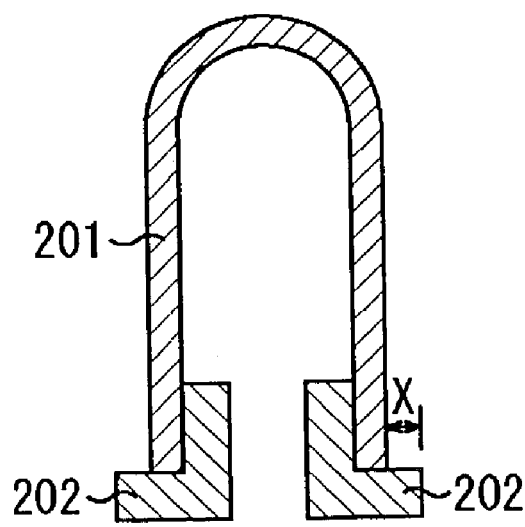
Figure 17A:
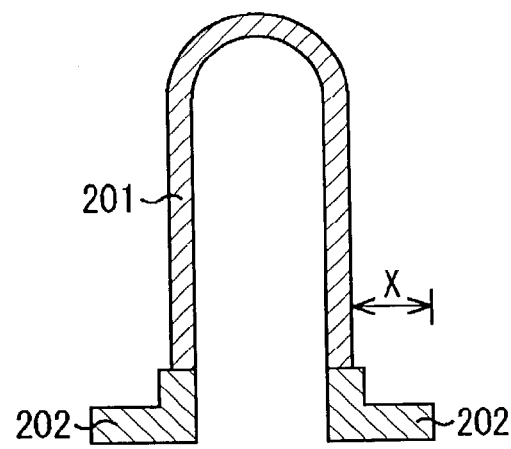
FIG. 17A to FIG. 17C are cross sectional views showing yet another preferred specific examples of the composite structure for transporting oxide ions.
Figure 17B:
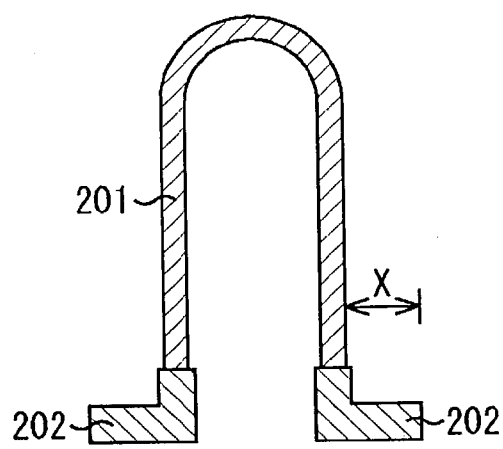
Figure 17C:
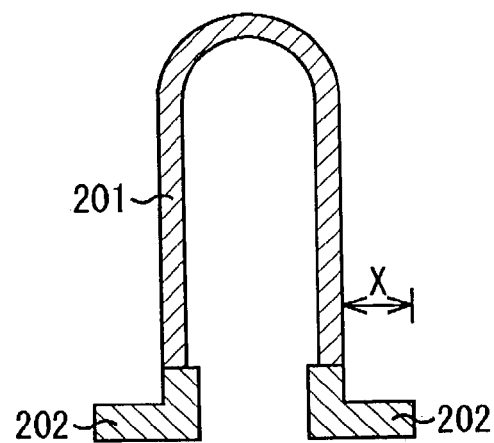
Figure 18A:
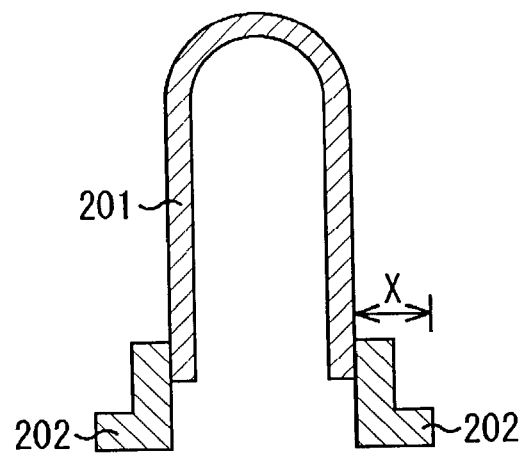
FIG. 18A to FIG. 18C are cross sectional views showing yet another preferred specific examples of the composite structure for transporting oxide ions.
Figure 18B:
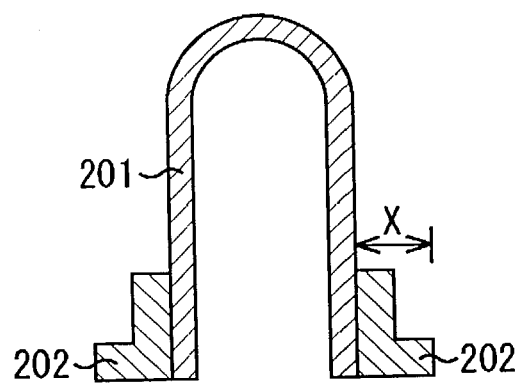
Figure 18C:
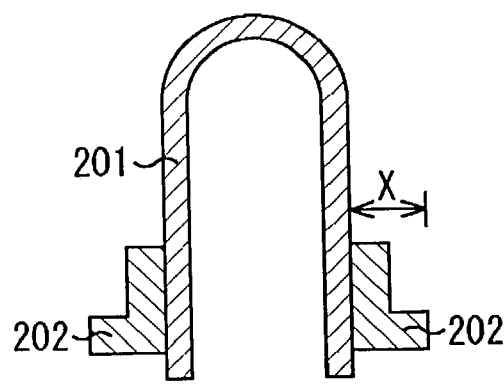

Each of drawings of FIG. 16A and FIG. 16B shows the structure in which an inner surface of the main part is bonded with the flange, and FIG. 16A is the structure taken as an example of the solid oxide fuel cell in aforesaid FIG. 14C. Here, the flange is a tubular body having an L-shaped cross section. Also in this case, the structure in FIG. 16B is more advantageous in terms of bonding strength than the structure in FIG. 16A, but the structure in FIG. 16A is also possible as long as bonding strength can be sufficiently secured. Any of the structures can be appropriately selected depending on the application of the composite structure.

Structures shown in FIG. 17A to FIG. 17C and FIG. 18A to FIG. 18C are based on the composite structures in FIG. 11A to FIG. 11C and FIG. 15A to FIG. 15C respectively, and each of them has a tubular body whose flange has an L-shaped cross section. Specifically, a bottom surface of the main part and the flange are bonded in each of FIG. 17A to FIG. 17C an outer surface of the main part and the flange are bonded and in each of FIG. 18A to FIG. 18C. It can be stated that these structures are advantageous in that, by being thus bonded, a bonded area between the flange and the metal member can be efficiently made large without substantially increasing a material used for the flange.

Next, when ceramic of the oxide ion transporting ceramic dense film, the porous ceramic base, and the flange is all a mixed-conducting oxide in the present invention, the composite structure can be preferably used for a device for producing pure oxygen, oxygen-rich air, or the like or a membrane reactor. If all of the ceramic is the mixed-conducting oxide, it is advantageous in terms of matching of thermal expansivity and avoidance of unnecessary chemical reaction at a bonded interface.

Specific materials for the ceramic of the oxide ion transporting ceramic dense film and the porous ceramic base are preferably selected from such materials that deformation starting temperature or decomposition starting temperature of the porous ceramic base is higher than densification temperature of the oxide ion transporting ceramic dense film. This is closely associated with a method of manufacturing the main part in the composite structure of the present invention.

Incidentally, the densification temperature of a material here means firing temperature necessary for increasing relative density of the material to, for example, 94% or higher.

The main part of the composite structure is manufactured in a manner that the porous ceramic base is first manufactured and the oxide ion transporting ceramic dense film is then formed over the base. The porous ceramic can be obtained by, for example, conducting process of mixing of raw materials to calcination, thereafter mixing polyvinyl alcohol fine powders in the calcined powders, and molding and firing them, similarly to the normal ceramic synthesis. This is because the polyvinyl alcohol fine powders are removed by oxidation and vaporization in the firing step and a remaining ceramic part is fired to form a robust network. The fine powders mixed in the calcined powders in thus manufacturing the porous ceramic need not be polyvinyl alcohol, and other organic compounds, carbon powders, or even sawdust is possible. There also exist various methods of forming the oxide ion transporting ceramic dense film formed thereon. For example, it is suitable that the calcined powders are deposited on the porous ceramic base by an application method, a soaking method, an electrophoretic deposition method, or the like using slurry obtained by dispersing the calcined powders in a solvent, and fired.

At this time, densification temperature of the oxide ion transporting ceramic dense film is higher than deformation starting temperature or decomposition starting temperature of the porous ceramic base, the porous ceramic base starts deformation or decomposition when the dense film is fired. Even when damage to such an extent does not occur on the porous ceramic base, the porosity decreases through the firing process of the dense film in some cases. Therefore, the material should be selected from such materials that deformation starting temperature or decomposition starting temperature of the porous ceramic base is higher than densification temperature of the oxide ion transporting ceramic dense film.

The relationship between deformation starting temperature or decomposition starting temperature of porous ceramic of the flange and densification temperature of the oxide ion transporting ceramic dense film changes depending on the manufacturing process. For example, when the porous ceramic base and the flange are bonded before forming the oxide ion transporting ceramic dense film, a material of the dense ceramic of the flange also needs to be selected from such materials that its deformation starting temperature or decomposition starting temperature is higher than densification temperature of the oxide ion transporting ceramic dense film from the aforesaid reason. On the other hand, when the oxide ion transporting ceramic dense film is formed and thereafter the porous ceramic base covered with the oxide ion transporting ceramic dense film and the flange are bonded, consideration of the relationship associated with the firing temperature is not necessarily required.

For the oxide ion transporting ceramic dense film, a mixed-conducting oxide having the cubic perovskite crystal structure and represented by the following composition formula (1) is preferably used.

$$[La_aA_b][B1_cB2_dB3_{(1-c-d)}]O_x \quad (1)$$

A perovskite crystal structure is represented by a general formula of $ABO_{3-\delta}$ and many crystal systems thereof such as a trigonal system, an orthorhombic system, and a hexagonal systems are known beside the cubic system. The difference comes from distortion of a crystal structure, regular/irregular arrangement of oxygen losses, difference in laminating $AO_3$ atomic layers, or the like. Further, it is also known that, when the oxygen losses increase and 3-δ in the composition formula decreases from 3 to 2.5, the perovskite crystal structure transforms to a brownmillerite structure, which is a different crystal structure. It has been found that a cubic oxide has high oxide ion conductivity among these many peroviskite crystals having the $ABO_{3-\delta}$ composition.

The inventors of the present invention have focused on the cubic perovskite crystal structure, studied a composition range in which oxide ion conductivity is high as well, and achieved a composition range disclosed in the present invention.

Specifically, a portion corresponding to A in the general formula of the composition formula $ABO_{3-\delta}$ is $[La_aA_b]$, in which A is one kind or combination of two or more kinds of elements selected from Sr, Ba, and Ca, $0 \leq a$ 0.5, and 0.5 $B \leq 1$. The reason for thus restricting the ranges of a and b is that the oxide ion conductivity lowers when La is excessively increased although the cubic system becomes more stable as La is increased more.

On the other hand, a portion corresponding to B in the general formula of the composition formula $ABO_{3-\delta}$ is $[B1_cB2_dB3_{(1-c-d)}]$, in which B1 is Co or combination of Co and Fe elements, a Co/Fe ratio is 1 or higher, B2 is one kind or combination of two or more kinds or elements selected from Nb, Ta, In, Sn, V, Ti, Cr, and Mn, B3 is one kind or combination of two or more kinds of elements selected from Li, Ni, Cu, Zn, and Mg, $0.6 \leq c$ 1, and 0 $d \leq 0.4$. The portion corresponding to B is thus restricted for the following reason. That is, as a result of selecting Sr(Co, Fe)$O_x$ as the basic composition of the cubic perovskite structure having high oxide ion conductivity and studying substitution of the B portion, it has been found that there are two substituting element systems showing different effects. First, a B2 system is a substituting element system stabilizing the cubic structure while having an effect of reducing oxygen losses because it has a large valence. While an element of the B2 system is indispensable in stabilizing the cubic structure, 0.4 or more B2 causes oxide ion conductivity to lower. Accordingly, d is defined in a range of 0 $d \leq 0.4$. On the other hand, a B3 system increases oxygen losses because of its small valence, which results in an effect of increasing oxide ion conductivity, but the structure transforms from the perovskite stable structure to a different crystal structure such as the brownmillerite structure and oxide ion conductivity lowers if an excessively large amount thereof is substituted. Accordingly, also in the B3 system, a substitution amount should be less than 0.4. Further, B1 is defined as Co or combination of Co and Fe elements and the Co/Fe ratio is defined as 1 or higher also because oxide ion conductivity lowers when Fe exceeds Co.

It should be noted that the chemical composition restricted in the present invention is the ideal one, and there is no problem even if a different type of metal at an impurity level is mixed in the oxide of the composition formula (1) as long as the cubic perovskite crystal structure is stable and oxide ion conductivity is not greatly impaired.

The composite structure of the present invention is intended to be applied to the applied device for oxide ion transportation, and, assuming that the reaction container of the device is made of metal, the composite structure can be most effectively applied to the applied device for oxide ion transportation if it is bonded with the metal member. At this time, it is obvious from the functions of the flange explained above that a counterpart of the metal member to be bonded is the flange of the composite structure.

For the metal member in this case, a wide range of materials such as stainless steel composed of iron, chrome, and nickel or a general heat-resistant alloy can be used. However, operation at high temperature is assumed in the application intended by the present invention, and therefore the restriction on the metal member of the present invention is that degradation in terms of a structure member, such as extreme oxidation or melting of the metal member itself, is not caused under the high temperature conditions (850° C., for example).

There is no restriction on a method of bonding the composite structure for transporting oxide ions of the present invention and any method can be used as long as the bonding does not impair the oxide ion transporting ceramic dense film, the porous ceramic base, and the dense ceramic of the flange by deformation or decomposition. For example, in bonding the main part and the flange, they may be bonded by applying slurry obtained by dispersing powders of the same ceramic raw material as the main part or the flange in a solvent on the bonded part and sintering it (causing solid phase reaction). Further, in bonding the flange and the metal member, a problem of ceramic breakage can be solved by using a metal such as silver, for example, which softens at operation temperature of the device to secure a gas sealing property as well as to absorb thermal expansion difference between ceramic of the flange and the metal member by the bonding member. Furthermore, a gasket for high temperature disclosed in Japanese Patent Application Laid-open No. Hei 7-57748 may be used.

Figure 19:
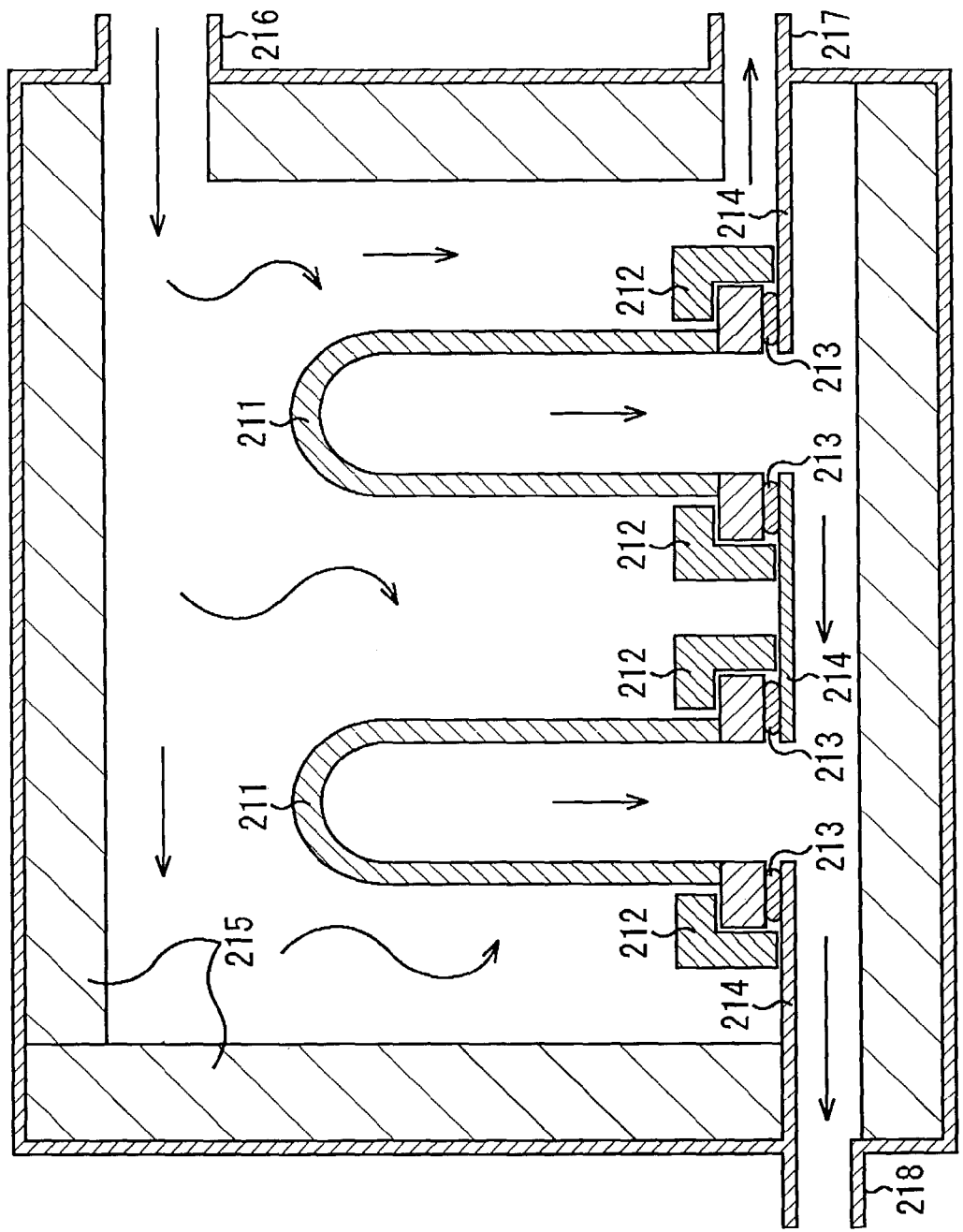
FIG. 19 is a schematic diagram showing an example of an oxygen production device as an example of an applied device for oxide ion transportation in which a plurality of the composite structures for transporting oxide ions are used.

An example of an applied device for oxide ion transportation in which a plurality of the oxide ion transporting composite structures according to the present invention are used is shown in FIG. 19. This is an example of an oxygen production device for obtaining atmospheric pure oxygen by transporting preferably oxide ions from the pressurized air. Although two composite structures are illustrated in FIG. 19 for convenience, any number thereof may be provided.

Composite structures 211 according to the present invention are fixed to a metal member 214 so that their flanges are pressed using fixing jigs 212. The metal member in this case composes a part of a case of the device. Gaskets 213 using silver which softens at high temperature are inserted between bonded surfaces of the flanges and the metal members and function as gas seals. The composite structures 211 are contained in thermal insulators 215 and the compressed air heated to 850° C. is introduced from an inlet 216 into a reaction chamber so that the composite structures are maintained at high temperature. Oxide ions permeate mixed-conducting ceramic dense films constituting main parts of the composite structures from the air introduced from the inlet 216, and the obtained pure oxygen is collected from a collection port 218. Further, oxygen-poor air whose oxygen partial pressure has lowered is emitted from an outlet 217.

Specific Examples

Hereinafter, effectiveness of the present invention will be clarified based on various specific examples.

The main part was manufactured by a method described below.

First, a tubular porous ceramic sealed at one end was manufactured in the following manner.

A prescribed amount of each of $SrCO_3$, $Co_3O_4$, and $Nb_2O_5$ as raw materials was weighed to obtain $Sr(Co_{0.9}Nb_{0.1})O_x$ and thereafter mixed by a ball mill for 24 hours together with a zirconia ball with isopropyl alcohol as a carrier medium. The slurry obtained after mixing was dried, shredded, packed in a square sheath made of MgO, and calcined at 850° C. for 12 hours in the atmosphere. PVA of 30 wt. % was added to the obtained calcined powders, and they were mixed and pulverized for two hours by a ball mill. The obtained mixed powders were molded at CIP pressure of 200 MPa using a rubber pressing method. This molded body was subjected to degreasing treatment for five hours at 450° C. in a square sheath made of MgO and subsequent firing treatment for five hours at 1275° C. Neither deformation nor decomposition was seen in the porous ceramic tubular body at this firing temperature. Thus, a tubular porous ceramic sealed at one end having the outer diameter of approximately 12 mm Φ, the length of 100 mm, and the thickness of 2 mm was obtained. Its porosity was 45%.

Subsequently, a mixed-conducting ceramic dense film was formed over this porous ceramic in the following manner. It should be noted that, as for $(La_{0.05}Sr_{0.95})(Co_{0.95}Nb_{0.05})O_x$ selected here for the mixed-conducting ceramic dense film, it had been found that its densification temperature is 1200° C. which is lower than deformation starting temperature or decomposition starting temperature of the porous ceramic, and it was confirmed that the conditions as the dense film are satisfied.

A prescribed amount of each of $La_2O_3$, $SrCO_3$, $Co_3O_4$, and $Nb_2O_5$ as raw materials was weighed so as to obtain $(La_{0.05}Sr_{0.95})(Co_{0.95}Nb_{0.05})O_x$ and thereafter mixed by a ball mill for 24 hours together with a zirconia ball with isopropyl alcohol as a carrier medium. The slurry obtained after mixing was dried, shredded, packed in a square sheath made of MgO, and calcined at 850° C. for 12 hours in the atmosphere. The obtained calcined powders were dispersed into water to make slurry, and it was applied onto an outer surface of the aforesaid porous body, dried, and sintered for five hours at 1200° C. in the atmosphere. The application and baking step was repeated three times to form the mixed-conducting ceramic dense film. Assuming that the formed thin film had been dense to theoretical density, it was found that the thin film had the thickness of approximately 0.1 mm as a result of calculation from change in weight of a specimen before and after the thin film formation.

Next, the flange was manufactured in a manner described below.

The aforesaid calcined powders used for manufacturing the porous ceramic were packed into a dice of 20 mm Φ to be uniaxially molded into a tablet, and further CIP molded at pressure of 200 MPa. The obtained molded body was fired for five hours at 1275° C. in a square sheath made of MgO so that a disc-shaped sintered body of approximately 17 mm Φ was obtained. This was horizontally sliced to have the thickness of 2 mm and a center part of the disc was cut out to have the diameter of 8 mm so that a toroidal sintered body was obtained.

The main part and the flange were bonded to be the structure in FIG. 11A. As a bonding method, the aforesaid slurry for manufacturing the dense film was applied onto the bonded surfaces of the main part and the flange and heat-treated for one hour at 1200° C. in the atmosphere.

Using the composite structure thus obtained, the oxygen permeation speed was evaluated. A stainless 310S tube and the flange of the composite structure described above were bonded using a silver gasket, and its outside was exposed to the air while pressure of its inside was reduced. Oxygen partial pressure of the reduced-pressure side was measured and the oxygen permeation speed was obtained based on the difference from a partial pressure value when oxygen does not permeate the sintered body. The specimen temperature was set to 750° C. As a result of measurement, permeation speed of 1.5 cc/cm$^2$·min was obtained. This value indicates the volume in a standard state of permeating oxygen per unit surface area of a mixed-conducting body and per minute, that is, an extremely excellent value. The air of the outside was replaced with a mixed gas of the air and helium and the presence or absence of gas leak through the specimen was checked using a helium leak detector. As a result, gas leak was not found.

Incidentally, the crystal structure of powders extracted from the dense film part, the porous ceramic base part, and the flange was studied using an X-ray analyzing device for powder at room temperature. As a result, it was revealed that all of them have the cubic perovskite crystal structure.

INDUSTRIAL APPLICABILITY

According to the present invention, a composite body having high reliability and an excellent sealing property can be provided at high temperature, which can increase a possibility of practical use in a wide region which has been delayed in development owing to a bottleneck in improvement of the sealing property so far. In particular, the application of the composite body to a device for producing pure oxygen, oxygen-rich air, or the like, a membrane reactor represented by that for partial oxidation of a hydrocarbon gas, a solid oxide fuel cell, an oxygen purification device, a heat exchanger, or the like can greatly contribute to acceleration in the development.

According to the present invention, a ceramic-metal composite structure is realized in which a gas sealing property at high temperature is given to a bonded part between ceramic and a metal member, durability against repetition of high temperature and room temperature is excellent, and maintainability can be improved.

According to the present invention, a gasket is realized in which a gas sealing property at high temperature is given to a bonded part with the ceramic-metal composite structure, durability against repetition of high temperature and room temperature is excellent, and maintainability can be improved.

According to the present invention, an applied device for oxygen transportation is realized which is structured to have the ceramic-metal composite structure in a case and in which a gas sealing property at high temperature is given to the bonded part between the ceramic and the metal member, durability against repetition of high temperature and room temperature is excellent, maintainability can be improved, and high efficiency can be attained at low costs.

According to the present invention, a composite structure for transporting oxide ions is provided which is excellent in oxide ion transportation efficiency and suitable for integration when a plurality of the structures are used at the same time, and which has excellent strength in term of a structure so that an applied device for oxide ion transportation of high efficiency can be assembled.

What is claimed is:

1. A composite body comprising:
   a structure which has a reservoir formed by combining plural members and at least one material of silver and a silver alloy which has a softening temperature that is lower than a softening temperature of the members constituting the structure, and having a sealing property,
   wherein the members constituting the structure are made of ceramic and metal, the structure is constituted as combination of ceramic and metal, wherein average linear thermal expansion coefficients from room temperature to 850° C. of the members are at least 16×10$^{-6}$/° C. and at most 26×10$^{-6}$/° C., wherein at least a part of the members is made of an oxide material having oxide ion permeability, wherein the at least one material is filled in the reservoir, and wherein at least a part of a combined boundary portion between the members constituting the structure is filled with the at least one material.

2. The composite body having the sealing property according to claim 1,
   wherein the oxide material having oxide ion permeability is a mixed-conducting oxide which has a cubic perovskite crystal structure and whose composition formula is represented by $\{La_aA_b\}\{B1_cB2_dB3_{(1-c-d)}\}O_x$, wherein A is at least one of one type and a combination of two or more types of elements selected from Sr, Ba, and Ca, wherein B1 is Co or combination of Co and Fe elements, wherein a Co/Fe ratio is 1 or higher, wherein B2 is at least one of one type and a combination of two or more kinds of elements selected from Nb, Ta, In, and Sn, wherein B3 is at least one of one type and a combination of two or more kinds of elements selected from Li, Ni, Cu, Zn, and Mg, wherein $0 \leq a < 0.5$, $0.5 < b \leq 1$, $0.6 \leq c < 1$, $0 \leq d \leq 0.4$, $0.9 \leq a+b \leq 1.1$, and wherein x is a number such that an electric charge of the compound becomes neutral.

3. An oxygen separation device, comprising:
   a composite body having a sealing property, the composite body including a reservoir formed by combining plural members and at least one material of silver and a silver alloy which has a softening temperature that is lower than a softening temperature of the members constituting the structure,
   wherein the members constituting the structure are made of ceramic and metal, the structure is constituted as combination of ceramic and metal, wherein average linear thermal expansion coefficients from room temperature to 850° C. of the members are at least 16×10$^{-6}$/° C. and at most 26×10$^{-6}$/° C., wherein at least a part of the members is made of an oxide material having oxide ion permeability, wherein the at least one material is filled in the reservoir, and wherein at least a part of a combined boundary portion between the members constituting the structure is filled with the at least one material.

4. A membrane reactor, comprising:
   a composite body having a sealing property, the composite body including a reservoir formed by combining plural members and at least one material of silver and a silver alloy which has a softening temperature that is lower than a softening temperature of the members constituting the structure, wherein the members constituting the structure are made of ceramic and metal, the structure is constituted as combination of ceramic and metal, wherein average linear thermal expansion coefficients from room temperature to 850° C. of the members are at least $16 \times 10^{-6}/°$ C. and at most $26 \times 10^{-6}/°$ C., wherein at least a part of the members is made of an oxide material having oxide ion permeability, wherein the at least one material is filled in the reservoir, and wherein at least a part of a combined boundary portion between the members constituting the structure is filled with the at least one material.

5. A composite body comprising:
a structure formed by at least combining:
   a hollow member which has an oxide ion permeable oxide layer, and which is sealed at one end and a flange member, and
   at least one material which is one of silver and a silver alloy to form a composite structure having a sealing property,
wherein the structure is a combination of metal and ceramic materials, has a reservoir formed by combining an open end of the hollow member and the flange member, and is obtained by filling the at least one material in the reservoir.

6. An oxygen separation device, comprising:
a composite body having a sealing property, and including a structure formed by at least combining:
   a hollow member which has an oxide ion permeable oxide layer, and which is sealed at one end and a flange member, and
   at least one material which is one of silver and a silver alloy to form a composite structure having a sealing property,
wherein the structure is a combination of metal and ceramic materials, has a reservoir formed by combining an open end of the hollow member and the flange member, and is obtained by filling the at least one material in the reservoir.

7. A membrane reactor, comprising:
a composite body having a sealing property, and including a structure formed by at least combining:
   a hollow member which has an oxide ion permeable oxide layer, and which is sealed at one end and a flange member, and
   at least one material which is one of silver and a silver alloy to form a composite structure having a sealing property,
wherein the structure is a combination of metal and ceramic materials, has a reservoir formed by combining an open end of the hollow member and the flange member, and is obtained by filling the at least one material in the reservoir.

* * * * *